(12) United States Patent
Matui et al.

(10) Patent No.: US 9,029,814 B2
(45) Date of Patent: May 12, 2015

(54) LED LIGHT SOURCE DEVICE

(75) Inventors: Ryotaro Matui, Hamamatsu (JP); Hideaki Yokoyama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/501,134

(22) PCT Filed: Jul. 27, 2010

(86) PCT No.: PCT/JP2010/062630
§ 371 (c)(1),
(2), (4) Date: May 3, 2012

(87) PCT Pub. No.: WO2011/045968
PCT Pub. Date: Apr. 21, 2011

(65) Prior Publication Data
US 2012/0228524 A1 Sep. 13, 2012

(30) Foreign Application Priority Data

Oct. 15, 2009 (JP) ................................ P2009-238375

(51) Int. Cl.
*F21V 29/00* (2006.01)
*B01J 19/12* (2006.01)
*F21Y 105/00* (2006.01)

(52) U.S. Cl.
CPC .............. *B01J 19/123* (2013.01); *F21V 29/00* (2013.01); *F21Y 2105/001* (2013.01); *F21V 29/22* (2013.01); *F21Y 2105/00* (2013.01)

(58) Field of Classification Search
CPC ....................... F21Y 2105/00; F21Y 2105/001
USPC .............. 250/504 R; 362/371, 367, 294, 373, 362/218, 249.02; 257/676; 361/688, 697, 361/702, 703, 709, 710
See application file for complete search history.

(56) References Cited

U.S. PATENT DOCUMENTS 4,254,453 A * 3/1981 Mouyard et al. .............. 362/240
4,783,920 A * 11/1988 Muller-Tolk .................... 40/550

(Continued)

FOREIGN PATENT DOCUMENTS

| CN | 1224522 | 7/1999 |
|---|---|---|
| CN | 101334153 | 12/2008 |

(Continued)

*Primary Examiner* — Jack Berman
*Assistant Examiner* — Kevin Chung
(74) *Attorney, Agent, or Firm* — Drinker Biddle & Reath LLP

(57) ABSTRACT

An LED light source device capable of making the amount of light of an emitting region a predetermined amount of light or more and uniformizing the amount of light is provided. The LED light source device 1 includes an ultraviolet LED array 3 including an LED juxtaposition region R in which LEDs 10 that emit ultraviolet light toward the front are juxtaposed, and a light transmitting member 4 provided on the front side of the LED juxtaposition region R of the ultraviolet LED array 3 so as to be opposed thereto, showing a rectangular parallelepiped outer shape, and formed of a material containing quartz. At a front surface 10a of the LED 10, an emitting surface S surrounded by a marginal portion 11 of a predetermined width H and for emitting the ultraviolet light is provided. Here, when viewed from the front, an end of the light transmitting member 4 is located between inside by ½ of the predetermined width H and outside by ½ of the predetermined width H with respect to an end of the LED juxtaposition region R of the ultraviolet LED array 3.

15 Claims, 18 Drawing Sheets

(56) References Cited

U.S. PATENT DOCUMENTS

| | | | |
|---|---|---|---|
| 5,924,785 A * | 7/1999 | Zhang et al. | 362/241 |
| 6,082,885 A * | 7/2000 | Belfer | 362/554 |
| 6,294,722 B1 * | 9/2001 | Kondo et al. | 136/244 |
| 6,445,373 B1 * | 9/2002 | Yamamoto | 345/102 |
| 6,476,551 B1 * | 11/2002 | Osawa et al. | 313/506 |
| 6,733,711 B2 * | 5/2004 | Durocher et al. | 264/272.14 |
| 6,964,507 B2 * | 11/2005 | Mohacsi | 362/545 |
| 7,036,946 B1 * | 5/2006 | Mosier | 362/27 |
| 7,138,667 B2 * | 11/2006 | Barnett et al. | 257/99 |
| 7,318,644 B2 * | 1/2008 | Abu-Ageel | 353/20 |
| 7,352,339 B2 * | 4/2008 | Morgan et al. | 345/31 |
| 7,498,610 B2 * | 3/2009 | Kim et al. | 257/99 |
| 2001/0030866 A1 * | 10/2001 | Hochstein | 362/294 |
| 2004/0166249 A1 * | 8/2004 | Siegel | 427/558 |
| 2005/0138852 A1 * | 6/2005 | Yamauchi | 40/582 |
| 2005/0168987 A1 * | 8/2005 | Tamaoki et al. | 362/244 |
| 2006/0113548 A1 * | 6/2006 | Chen et al. | 257/79 |
| 2006/0225495 A1 * | 10/2006 | Tatsuno | 73/149 |
| 2007/0053207 A1 * | 3/2007 | Kokogawa | 362/614 |
| 2007/0279931 A1 * | 12/2007 | Bryan et al. | 362/600 |
| 2008/0007668 A1 * | 1/2008 | Mishima et al. | 349/58 |
| 2008/0158878 A1 * | 7/2008 | Van Laanen et al. | 362/235 |
| 2008/0170371 A1 * | 7/2008 | Lai | 361/720 |
| 2008/0203911 A1 * | 8/2008 | Beckers | 313/512 |
| 2008/0253140 A1 * | 10/2008 | Fleischmann et al. | 362/487 |
| 2009/0026385 A1 * | 1/2009 | Knight et al. | 250/432 R |
| 2009/0122216 A1 * | 5/2009 | Kogure et al. | 349/58 |

FOREIGN PATENT DOCUMENTS

| | | |
|---|---|---|
| JP | 2004-274011 | 9/2004 |
| JP | 2005-166775 | 6/2005 |
| JP | 2005-203481 | 7/2005 |
| JP | 2005-353498 | 12/2005 |
| JP | 2006-269079 | 10/2006 |
| JP | 2007-80867 | 3/2007 |
| JP | 2007-207595 | 8/2007 |
| JP | 2007-222790 | 9/2007 |
| JP | 2008-004296 | 1/2008 |
| JP | 4055809 | 3/2008 |
| JP | 2008-186914 | 8/2008 |
| JP | 2008-305584 | 12/2008 |
| JP | 2009-049010 | 3/2009 |
| JP | 2009-123924 | 6/2009 |
| JP | 2010-272440 | 12/2010 |

* cited by examiner

LED LIGHT SOURCE DEVICE

TECHNICAL FIELD

The present invention relates to an LED light source device that emits ultraviolet light.

BACKGROUND ART

As a conventional LED light source device, there has been known one described in, for example, the following patent document 1. In such an LED light source device, a translucent member made of acrylic is disposed on a front side of an LED array for which LEDs that emit visible light forward are juxtaposed, and a space between the LED array and translucent member is sealed by a transparent resin made of silicone. Then, visible light from the LEDs is emitted via the transparent resin and translucent member.

CITATION LIST

Patent Literature

Patent Document 1: Japanese Patent Application Laid-Open No. 2008-186914

SUMMARY OF INVENTION

Technical Problem

Here, in such an LED light source device as described above, for example, when ultraviolet light is emitted to perform a process using light energy of the ultraviolet light, its processing ability greatly depends on the amount of light, and thus it is particularly demanded to make the amount of light of an emitting region a predetermined amount of light or more and uniformize the amount of light. However, in such an LED light source device as described above, the amount of light easily decreases at end portions of the emitting region, and the distribution of the amount of light easily shows a so-called fat-tailed state, and thus it is difficult to make the amount of light of the emitting region a predetermined amount of light or more and uniformize the amount of light.

Therefore, it is an object of the present invention to provide an LED light source device capable of making the amount of light of the emitting region a predetermined amount of light or more and uniformizing the amount of light.

Solution to Problem

In order to achieve the above-described object, an LED light source device according to the present invention includes an ultraviolet LED array including an LED juxtaposition region in which LEDs that emit ultraviolet light toward the front are juxtaposed, and a light transmitting member provided on the front side of the LED juxtaposition region of the ultraviolet LED array so as to be opposed thereto, showing a rectangular parallelepiped outer shape, and formed of a material containing quartz, in which at a front surface of the LEDs, an emitting surface surrounded by a marginal portion of a predetermined width and for emitting the ultraviolet light is provided, and when viewed from the front, an end of the light transmitting member is located between inside by ½ of the predetermined width and outside by ½ of the predetermined width with respect to an end of the LED juxtaposition region of the ultraviolet LED array.

In this LED light source device, because ultraviolet light emitted from the LEDs repeats total reflection inside the light transmitting member to be output forward, the peak amount of light in the output ultraviolet light (hereinafter, referred to as "output light") can be increased. Here, because the light transmitting member shows a rectangular parallelepiped outer shape, ultraviolet light emitted from the LEDs can be reliably led to the light transmitting member, and a decrease (loss) in the amount of output light can be suppressed. Further, in addition thereto, when viewed from the front, because the ends of the light transmitting member are located between inside by ½ of the predetermined width and outside by ½ of the predetermined width with respect to the ends of the LED juxtaposition region of the ultraviolet LED array, respectively, the amount of light of the emitting region can be made a predetermined amount of light or more and uniformized. This is because of the following: as shown in, for example, FIG. 14, when the ends of the light transmitting member are too far apart inside from the ends of the LED juxtaposition region, respectively (broken line in the figure), there is provided a distribution of the amount of light gathering toward the center of the emitting region, so that the peak amount of light is increased, but the amount of light at end portions of the emitting region is low; moreover, when the ends of the light transmitting member are too far apart outside from the ends of the LED juxtaposition region, respectively (dotted line in the figure), the distribution of the amount of light shows a so-called fat-tailed state, and the peak amount of light decreases; and on the other hand, when the ends of the light transmitting member are located in a range of being inside by ½ of the predetermined width to outside by ½ thereof with respect to the ends of the LED juxtaposition region, respectively, (solid line in the figure), it becomes possible to sufficiently secure the peak amount of light while increasing the degree of rising and falling in the distribution of the amount of light.

Moreover, it is preferable that the light transmitting member is in contact with a front surface of the LEDs. In this case, ultraviolet light emitted from the LEDs can be more reliably led to the light transmitting member, and it becomes possible to suppress a decrease in the amount of light in the emitting region.

Moreover, it is preferable that the ultraviolet LED array includes a plurality of LED units each including a substrate and the LEDs juxtaposed so as to be adjacent to each other on a front surface side of the substrate, and the LED units are juxtaposed so that the LEDs are adjacent. In this case, the LEDs can be easily provided in a dense arrangement, and it becomes possible to obtain a large amount of light uniformly in the emitting region.

At this time, it is preferable that the LEDs show a rectangular parallelepiped outer shape, and are disposed on the substrate so that a side surface thereof is located on the same plane as a side surface of the substrate or disposed on the substrate so that a side surface thereof projects to the outside further than a side surface of the substrate. In this case, the LEDs between the juxtaposed LED units are also provided in a more dense arrangement.

Moreover, it is preferable to include a metal plate provided on a rear surface side of the substrate, and thermally connected with the LEDs via a through-hole formed in the substrate, and a heat sink thermally connected with the metal plate. In this case, the heat dissipation performance of the LEDs can be improved, and the operation stability of the LEDs can be improved.

Moreover, it is preferable that the light transmitting member is fixed by a pair of opposing side surfaces thereof being sandwiched by pressing members via interposing members.

In this case, a situation such that ultraviolet light causes insufficient fixation of the light transmitting member can be prevented, and it becomes possible to stably fix the light transmitting member.

At this time, it is preferable that the interposing member is formed of a material containing a fluororesin. In this case, the ultraviolet resistance property and heat resistance property can be improved with regard to fixation of the light transmitting member.

Moreover, it is preferable that the pressing member has a screw mechanism. In this case, it becomes possible to easily fine adjust the fixing position of the light transmitting member.

Moreover, it is preferable to include a case for housing the ultraviolet LED array and the light transmitting member, and that in a front cover of the case, a pair of wall portions extending in a long side direction of the light transmitting member are formed, and the light transmitting member is fixed to the front cover by being sandwiched by the pair of wall portions via a resin member. In this case, it becomes possible to easily perform positioning of the light transmitting member for fixing the light transmitting member.

At this time, it is preferable that the resin member is an O-ring provided so as to wind around side surfaces of the light transmitting member. In this case, the light transmitting member can be easily fixed.

Moreover, it is preferable that the light transmitting member is fixed by adhesion with respect to the ultraviolet LED array. In this case, it becomes possible to stably fix the light transmitting member.

ADVANTAGEOUS EFFECTS OF INVENTION

According to the present invention, the amount of light of the emitting region can be made a predetermined amount of light or more and uniformized.

DESCRIPTION OF EMBODIMENTS

Figure 1:
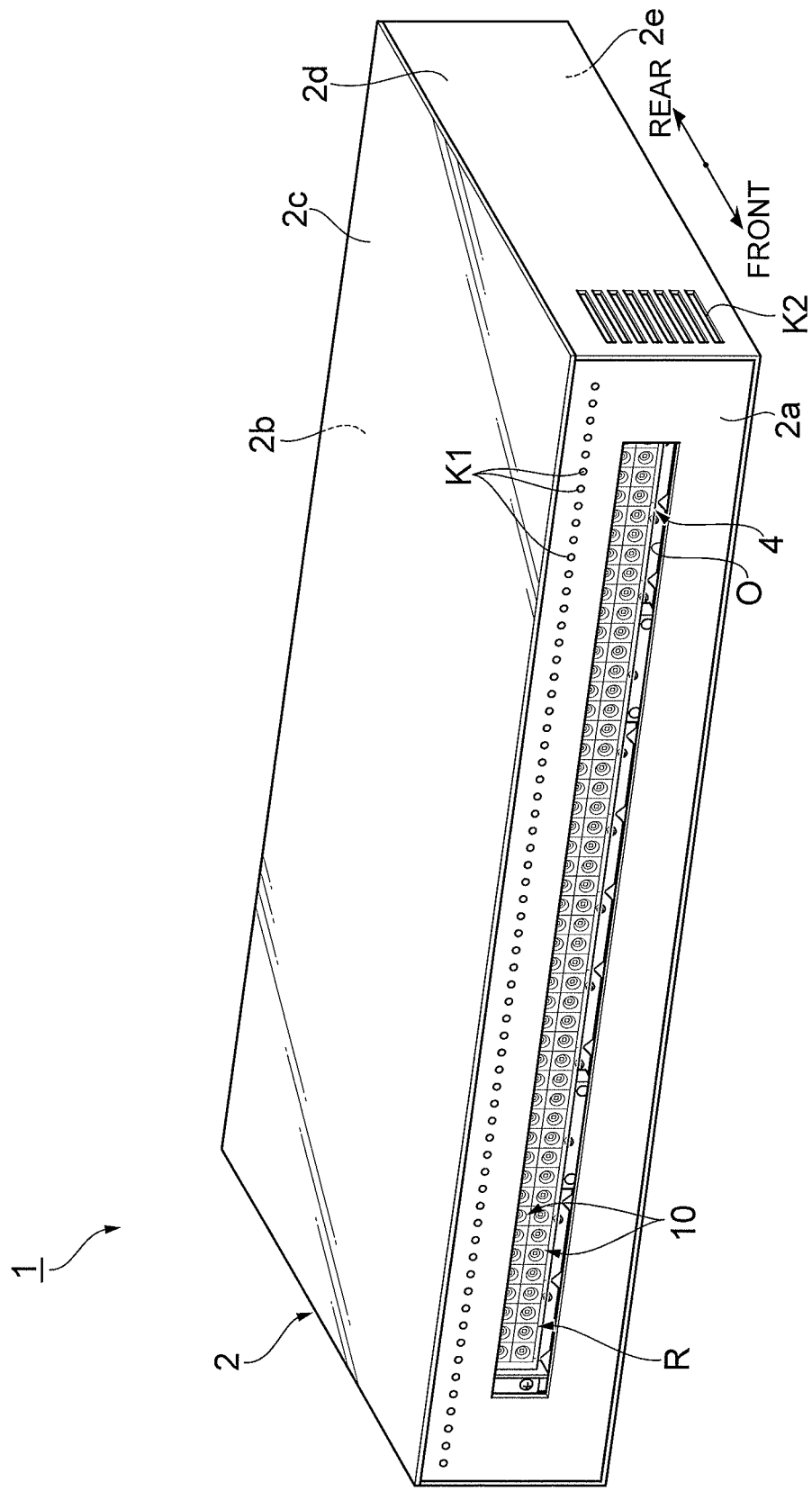
[FIG. 1] A front perspective view showing an LED light source device according to an embodiment of the present invention.

Hereinafter, a preferred embodiment of the present invention will be described in detail with reference to the drawings. The same or corresponding components are denoted with the same reference signs in the figures, and overlapping description will be omitted. It is noted that terms "upper," "up," "lower," "down," "left," and "right" are used for descriptive purposes based on the states shown in the drawings.

Figure 2:
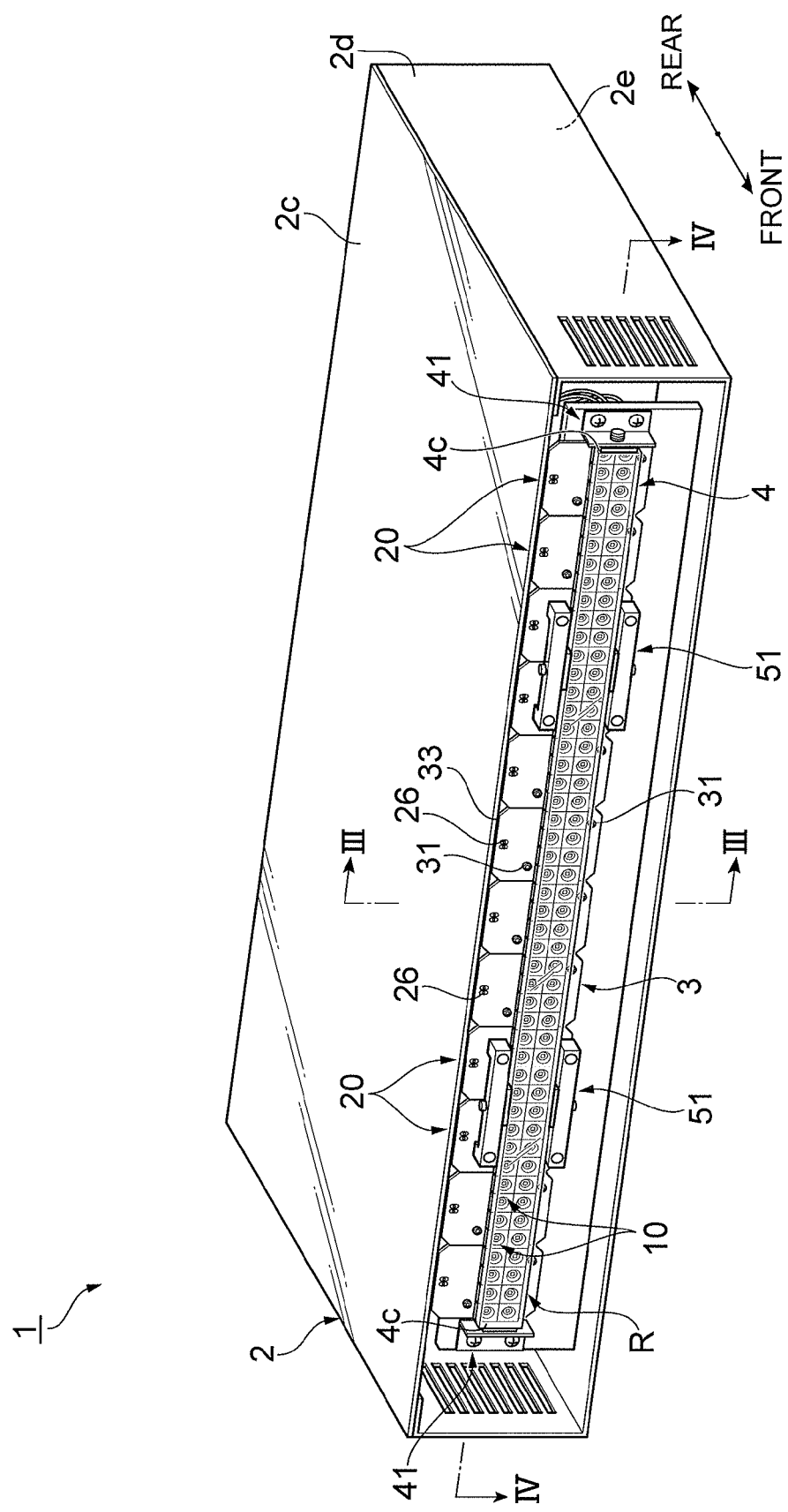
[FIG. 2] A front perspective view showing a state without a front cover of the LED light source device of FIG. 1.

FIG. 1 is a front perspective view showing an LED light source device according to an embodiment of the present invention, and FIG. 2 is a front perspective view showing a state without a front cover of the LED light source device of FIG. 1. As shown in FIGS. 1 and 2, the LED light source device 1 of the present embodiment includes, inside a case 2 having a rectangular parallelepiped outer shape that forms its enclosure, an ultraviolet LED array 3, a light transmitting member 4, and a heat sink 5 (refer to FIG. 9). The LED light source device 1 performs, for example, resin curing or ink drying by irradiation with ultraviolet light (referred to also as ultraviolet rays or UV light) as LED light through an opening O formed in a front cover 2a.

In the ultraviolet LED array 3, a plurality of LEDs (Light-Emitting Diodes) 10 that emit ultraviolet light toward the front are juxtaposed in a matrix to form an LED juxtaposition region R. In the ultraviolet LED array 3 here, the LED juxtaposition region R as a disposition area in which a plurality of LEDs 10 are disposed is formed by juxtaposing LED units 20 (refer to FIG. 5), for each of which a plurality of LEDs 10 are unitized, so as to be adjacent in the left and right direction. The LED juxtaposition region R is surrounded by an outermost margin of the ultraviolet LED array 3 (LEDs 10) when viewed from the front (ultraviolet emitting side). The LED juxtaposition region R of the present embodiment consists of two upper and lower rows of 45 LEDs 10 from side to side (a total of 90 LEDs) juxtaposed, and is provided as a region having an oblong shape whose short side direction is the up and down direction and whose long side direction is the left and right direction in a front view.

Figure 3:
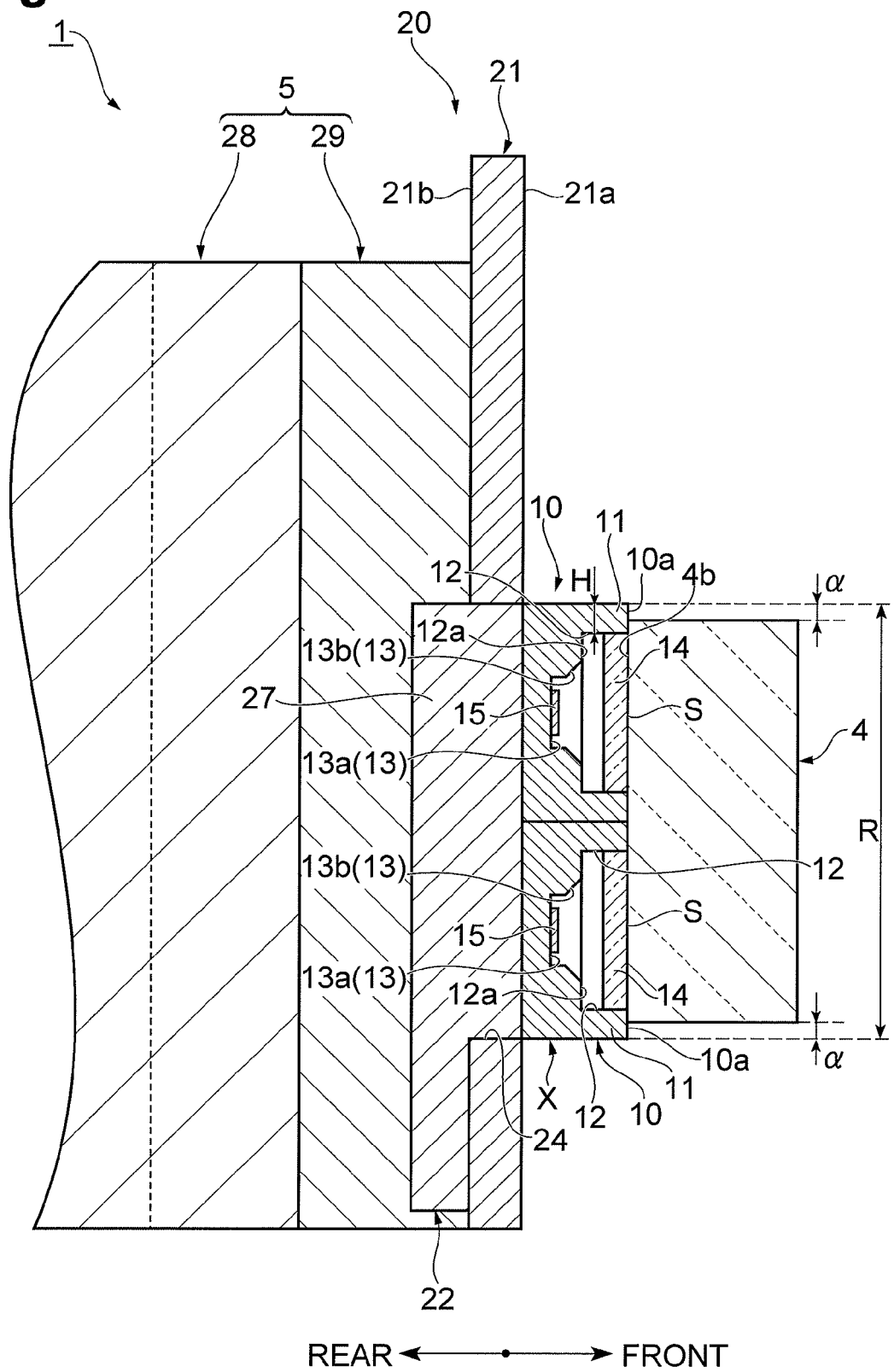
[FIG. 3] A schematic view showing a part of a section along a line of FIG. 2.
Figure 4:
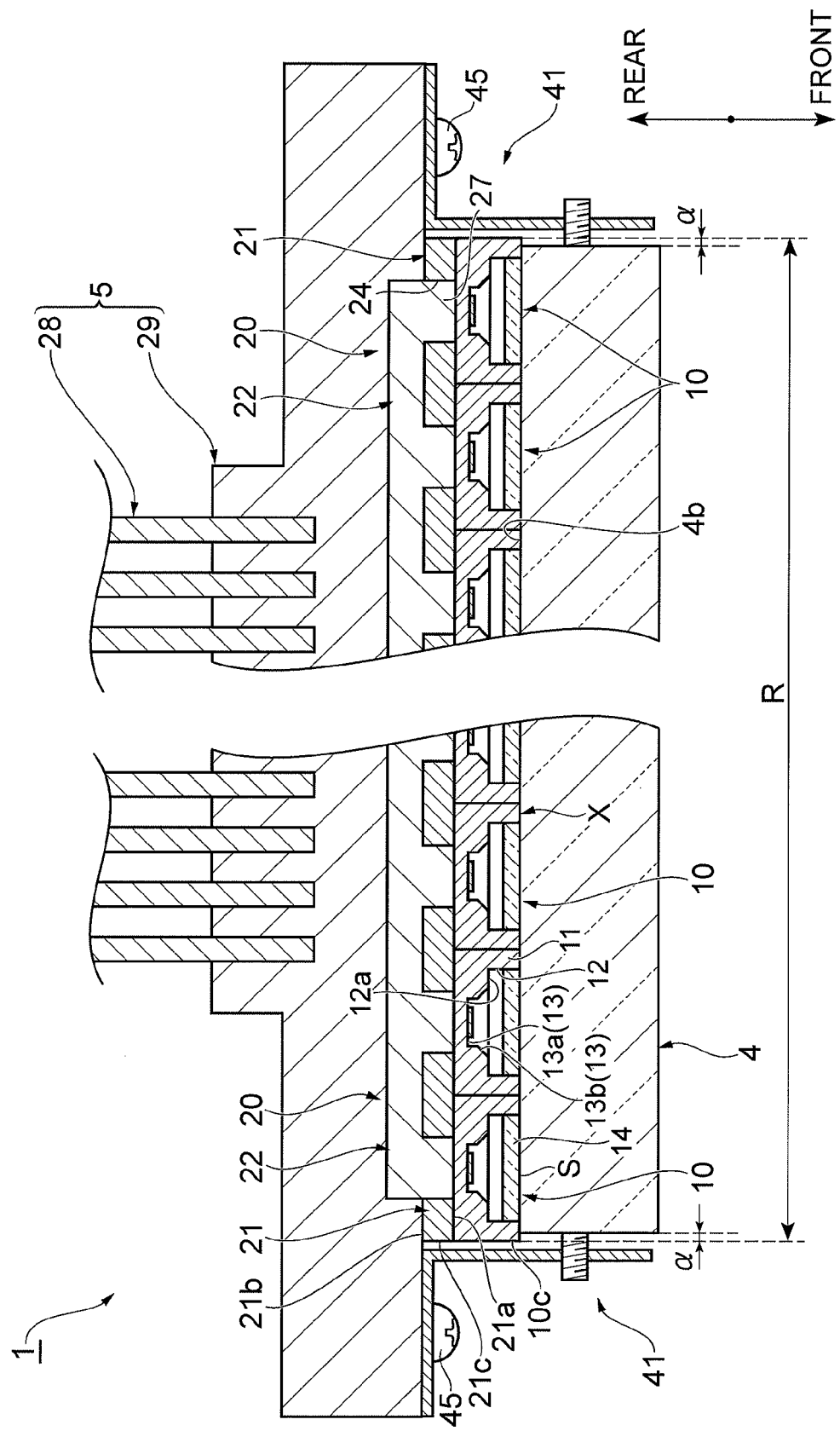
[FIG. 4] A schematic view showing a part of a section along a line IV-IV of FIG. 2.
Figure 5:
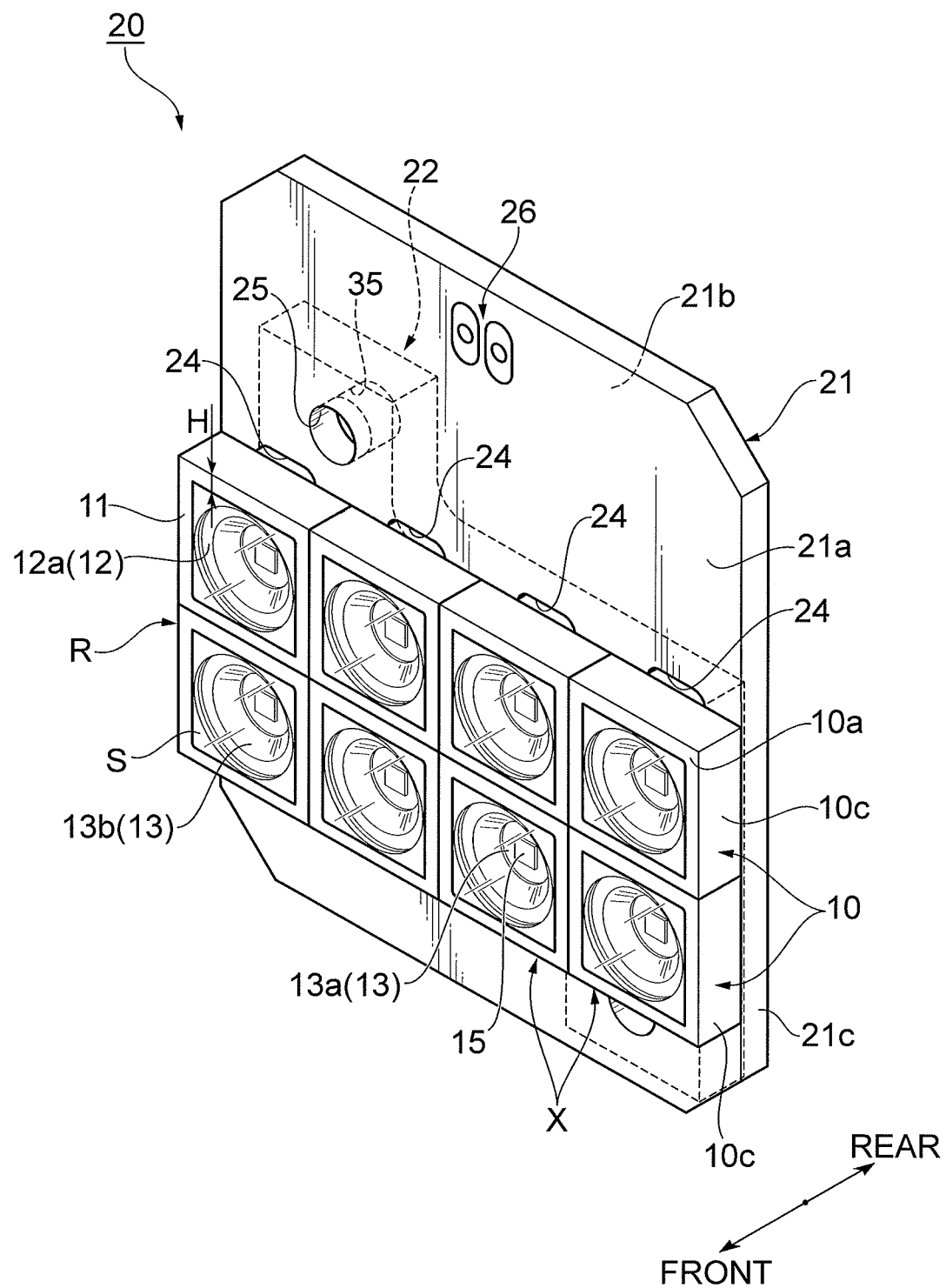
[FIG. 5] A front perspective view showing an LED unit of the LED light source device of FIG. 1.

FIG. 3 is a schematic view showing a part of a section along a line of FIG. 2, FIG. 4 is a schematic view showing a part of a section along a line IV-IV of FIG. 2, and FIG. 5 is a front perspective view showing an LED unit of the LED light source device of FIG. 1. As shown in FIGS. 3 to 5, the LED unit 20 includes a substrate 21, LEDs 10 juxtaposed in a plural number on the side of a front surface 21a of the substrate 21, and a thermally conductive plate (metal plate) 22 fixed to the side of a rear surface (back surface) 21b of the substrate 21.

The LED 10 is an ultraviolet light emitting chip type light emitting element for which semiconductor crystals 15 are housed inside a housing X showing a rectangular parallelepiped outer shape and sealing is provided by a glass plate 14, and emits a high output ultraviolet light. The LED 10 (housing X) has a square shape when viewed from a front surface 10a thereof from which ultraviolet light is emitted, and has, for example, widths of vertically 7 mm×horizontally 7 mm.

Specifically, in the LED 10, a recess portion 12 having a circular section is formed in such a manner so as to be surrounded by a frame-shaped marginal portion 11 having a predetermined width H when viewed from the front. In other words, the LED 10 has a recess portion 12 formed inside a rectangular frame-shaped marginal portion 11 having a predetermined width H. Further, at a bottom surface 12a of the recess portion 12, a recess portion 13 having a circular section is formed.

At the side of the front surface 10a inside of the recess portion 12, a glass plate 14 that transmits ultraviolet light is provided so as to be the same plane as the front surface 10a, and the inside of the LED 10 is thereby sealed. The glass plate 14 forms an emitting surface S to emit ultraviolet light. At a bottom surface 13a of the recess portion 13, semiconductor crystals 15 for producing ultraviolet light are fixed. Moreover, an inner side surface of the recess portion 13 is provided as a reflecting surface 13b that inclines so as to expand forward in order to reflect ultraviolet light toward the front.

Based on the above, the predetermined width H of the LED 10 in the present embodiment means the width of the frame 11 of the housing X that surrounds the glass plate 14 serving as the emitting surface S of the LED 10. In other words, the predetermined width H corresponds to the length of a part where a straight line that is extended from the center of the recess portion 12 to the periphery of the LED juxtaposition region R intersects the marginal portion 11 of the LED 10 when viewed from the front. Here, the predetermined width H is provided as 2 mm. In the following, the predetermined width H is considered to be two times (that is, 2α) a predetermined value α, and the predetermined value α is therefore provided as 1 mm.

Figure 6:
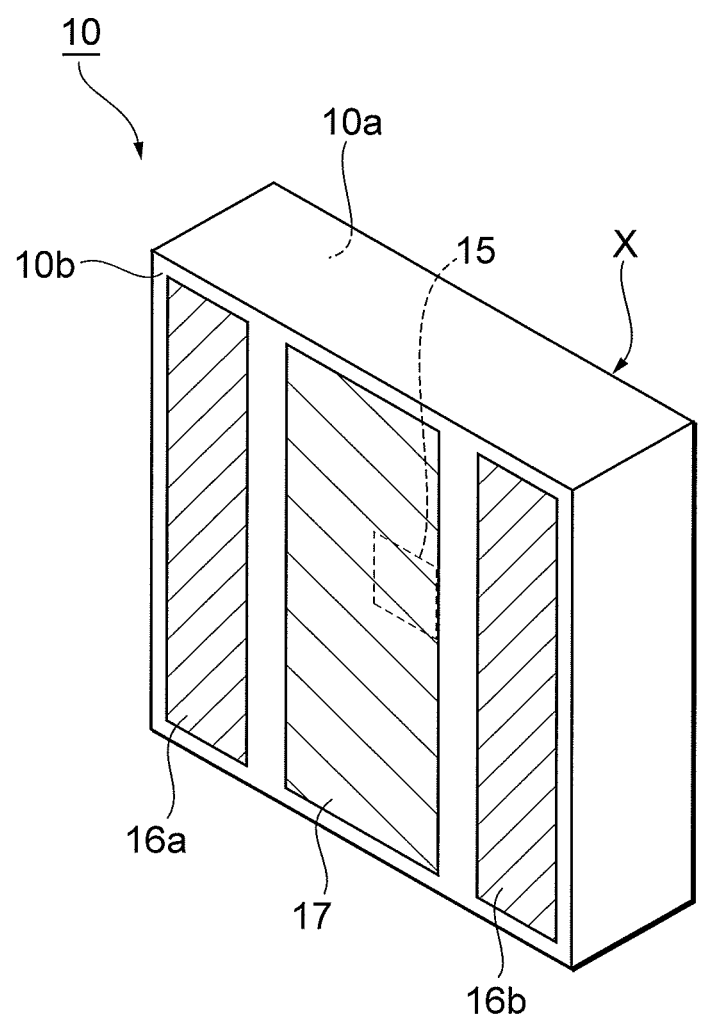
[FIG. 6] A rear perspective view showing an LED in the LED unit of the LED light source device of FIG. 1.

FIG. 6 is a rear perspective view showing an LED in the LED unit of the LED light source device of FIG. 1. As shown in FIG. 6, at both end portions of a rear surface 10b (surface on the opposite side to the front surface 10a), a cathode terminal 16a and an anode terminal 16b that extend in parallel are provided. Between the cathode terminal 16a and the anode terminal 16b in the rear surface 10b, a metallic heat dissipating surface 17 showing a rectangular shape is provided as a surface to cool the LED 10.

Figure 7:
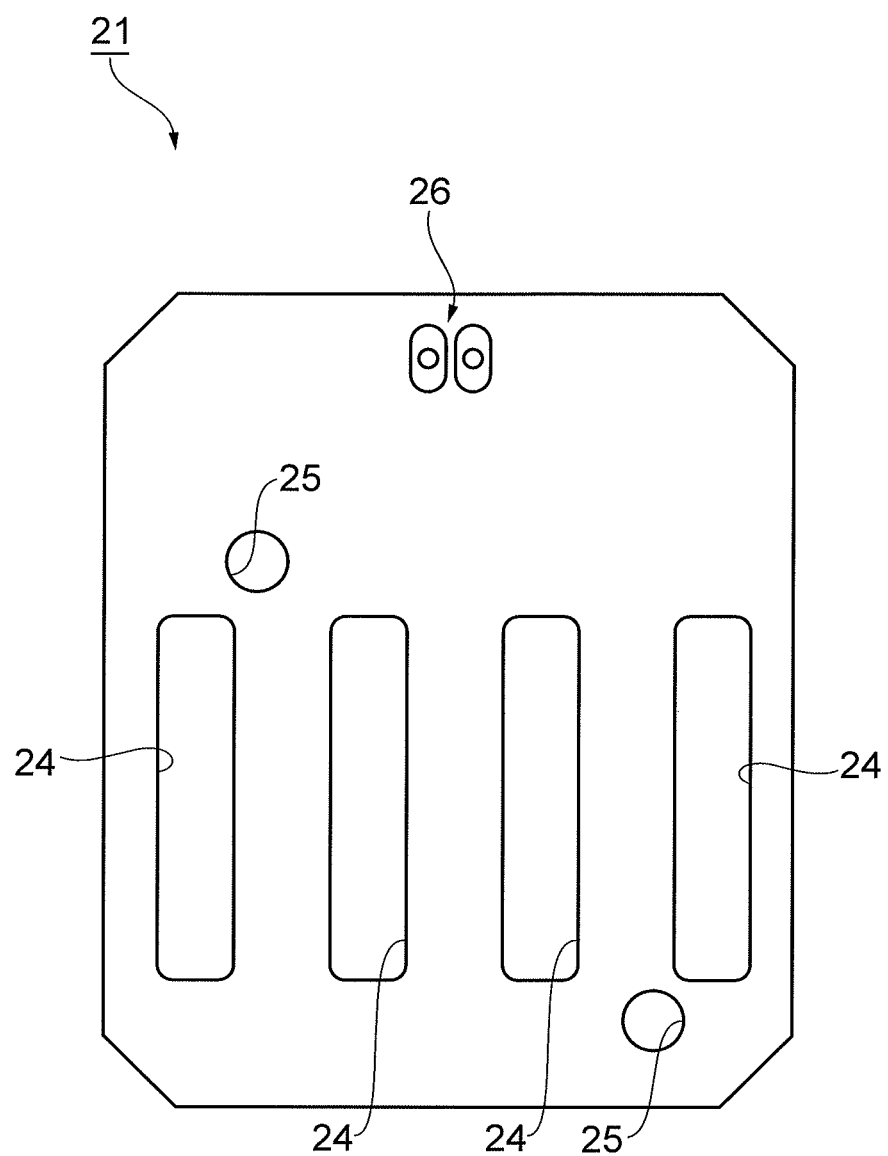
[FIG. 7] A front view showing a substrate in the LED unit of the LED light source device of FIG. 1.

FIG. 7 is a front view showing a substrate in the LED unit of the LED light source device of FIG. 1. As shown in FIG. 7, the substrate 21 shows a rectangular plate shape whose two opposing sides have linear portions, and includes a plurality of through-holes 24 for bringing the LEDs 10 into contact with the thermally conductive plate 22. The through-holes 24 are provided so as to correspond to the juxtaposed LEDs 10, and here, extend in the up and down direction and are formed in four columns in the left and right direction. Moreover, the substrate 21 is formed with a pair of through-holes 25 through which screws 31 (refer to FIG. 2) to fix the LED unit 20 to the inside of the case 2 are inserted, respectively.

Figure 9:
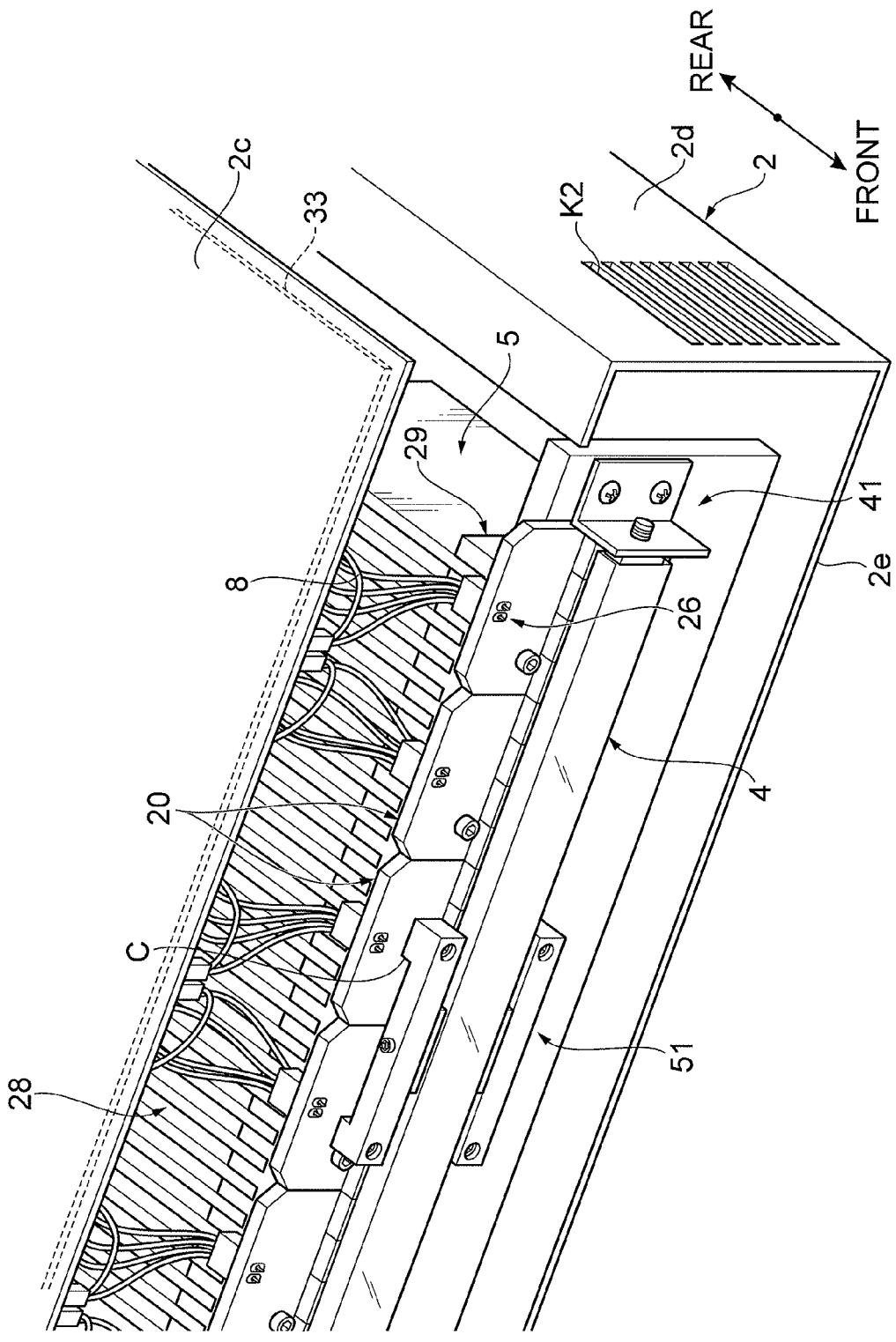
[FIG. 9] A front perspective view showing a part of a state without a front cover and an upper cover of the LED light source device of FIG. 1.

Moreover, at an upper portion of the substrate 21, a power supply wiring portion 26 is provided. The power supply wiring portion 26, which is a collection of electrical wiring patterns (not shown) provided on the substrate 21 and to be electrically connected to the LEDs 10, provides an integrated power supply portion for the LEDs 10. As shown in FIG. 9, the power supply wiring portion 26 is electrically connected by a wiring 8 with respect to a circuit element and the like of a substrate 33 fixed to an upper cover 2c.

Figure 8:
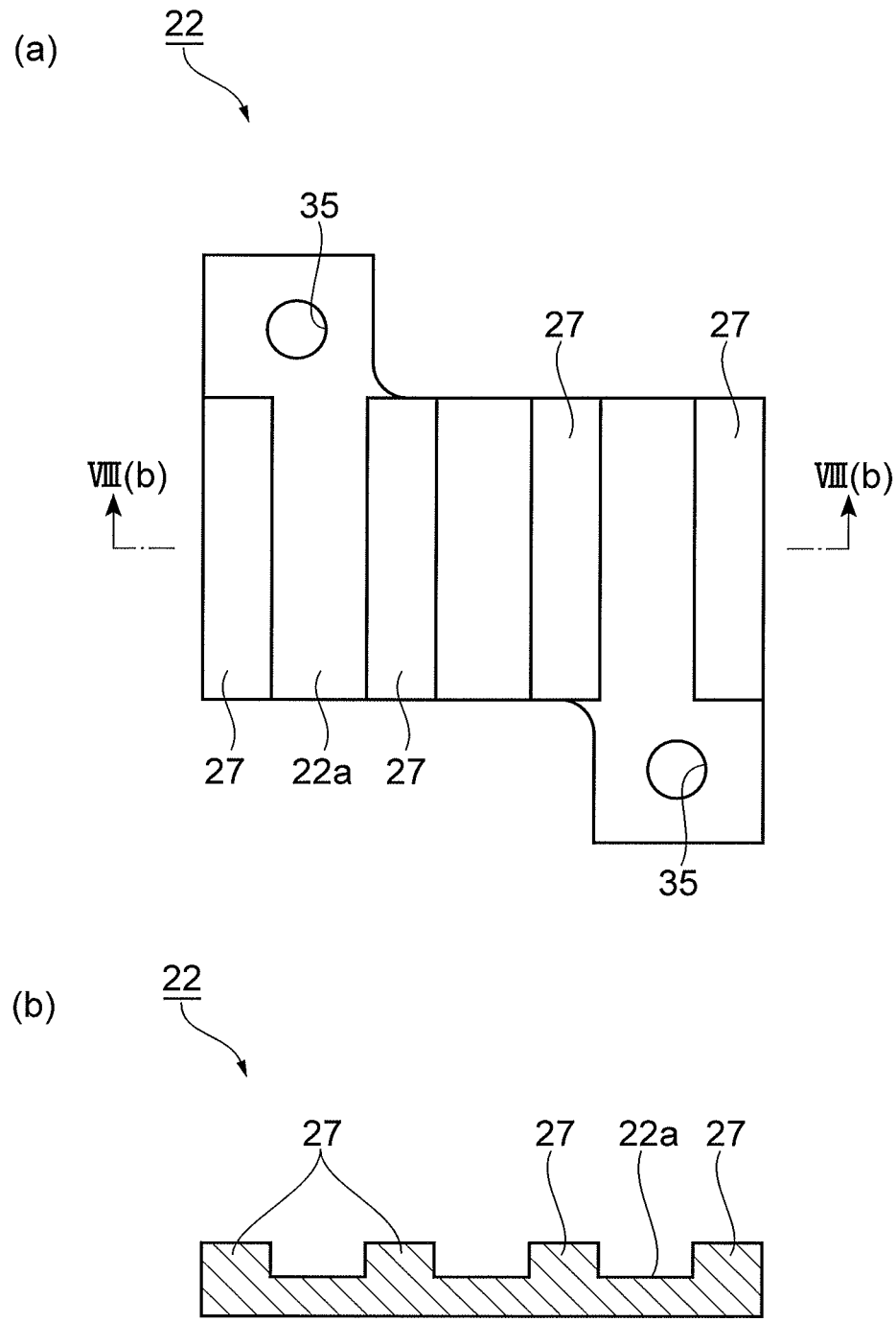
[FIG. 8] Views showing a thermally conductive plate in the LED unit of the LED light source device of FIG. 1.

FIG. 8(a) is a front view showing a thermally conductive plate in the LED unit of the LED light source device of FIG. 1, and FIG. 8(b) is a sectional view along a line VIII(b)-VIII(b) of FIG. 8(a). As shown in FIGS. 8, one thermally conductive plate 22 is provided for each substrate 21 to function as a thermally conductive member that conducts heat of the multiple LEDs 10 to the heat sink 5 collectively, and is formed of, for example, a metallic material with a high thermal conductivity such as copper. At a front surface 22a of the thermally conductive plate 22, a plurality of projecting portions 27 extending in the up and down direction are formed as portions that enter into the through-holes 24 of the substrate 21, and make contact with the heat dissipating surfaces 17 of the LEDs 10, respectively. The projecting portions 27 project at least as thick as the substrate 21. Moreover, in the thermally conductive plate 22, a pair of through-holes 35 that communicate with the through-holes 25 of the substrate 21, respectively, are formed. The thermally conductive plate 22 has such a size and shape so as to fit inside the rear surface 21b of the substrate 21.

As shown in FIG. 5, in the LED unit 20 including such LEDs 10, substrate 21, and thermally conductive plate 22 as in the above, a plurality of LEDs 10 are juxtaposed on each of the through-holes 24, 24, 24, 24 in the front surface 21a of the substrate 21 while the terminals 16a, 16b of the LEDs 10 and the power supply wiring portion 26 are electrically connected via electrical wiring patterns (not shown). Here, two rows and four columns of LEDs 10 with their mutual side surfaces made adjacent are disposed and fixed to the substrate 21. Moreover, the LEDs 10 and the substrate 21 are disposed so that, at each of both side portions in the left and right direction being a juxtaposing direction of the LED units 20, side surfaces 10c of the LEDs 10 lie along a side surface 21c of the substrate 21 and are adjacent thereto. In greater detail, the side surfaces 10c of the LEDs 10 are located on the same plane as (become flush with) the side surface 21c of the substrate 21.

Simultaneously therewith, as shown in FIGS. 3 and 4, the projecting portions 27 of the thermally conductive plate 22 disposed so as to fit inside the rear surface 21b of the substrate 21 with the substrate 21 sandwiched enter into the through-holes 24, respectively, while the thermally conductive plate 22 is fixed by brazing to the heat dissipating surfaces 17 (refer to FIG. 6) of the rear surfaces 10b of the LEDs 10. Accordingly, the LEDs 10, the substrate 21, and the thermally conductive plate 22 are united, while the heat dissipating surfaces 17 (refer to FIG. 6) of the rear surfaces 10b of the LEDs 10 are thermally connected to the thermally conductive plate 22. Further, by juxtaposing the LED units 20 in the left and right direction inside the case 2 so that left and right side surfaces of the neighboring LED units 20 are adjacent to each other and, more preferably, without a gap therebetween, an ultraviolet LED array 3 in which the LEDs 10 are successively disposed in an adjacent manner is formed.

FIG. 9 is a front perspective view showing a part of a state without a front cover and an upper cover of the LED light source device of FIG. 1. As shown in FIG. 9, the heat sink 5, which dissipates heat of the LEDs 10, is formed of, for example, an aluminum material. The heat sink 5, as shown in FIG. 4, includes a main body 28 having a fin structure where a plurality of metal plates are stacked in the left and right direction apart from each other and a plate-shaped joint portion 29 that fixes the main body 28 and joins the main body 28 to the thermally conductive plate 22.

The heat sink 5 is disposed on a rear side of the LED unit 20 inside the case 2. Simultaneously therewith, its joint portion 29 is brought into contact with the thermally conductive plate 22 of the LED unit 20 via a resin (grease) with a high thermal conductivity. Further, the heat sink 5 and the LED unit 20 are joined and fixed to each other by the screws 31 inserted though the through-holes 25, 35 of the LED unit 20. By thus bringing the joint portion 29 and the thermally conductive plate 22 into contact via the grease, heat dissipation performance can be improved through improvement in adhesion.

Referring back to FIG. 2, similar to the ultraviolet LED array 3, the light transmitting member 4 shows a rectangular parallelepiped outer shape whose short side direction is the up and down direction and whose long side direction is the left and right direction and having a thickness smaller than the length in the short side direction, and is made of quartz. The light transmitting member 4 has a function as a lens or a mixing member, and repeatedly totally reflects inside ultraviolet light emitted from the LEDs 10 to increase the peak amount of ultraviolet light while uniformizing the amount of light. The light transmitting member 4 is subjected to mirror polishing at its outer surface. The thickness of the light transmitting member 4 is 3 mm to 20 mm, and more preferably, 4 mm to 12 mm, and in the present embodiment, provided as 5 mm.

The light transmitting member 4, as shown in FIGS. 3 and 4, is provided on the front side of the LED juxtaposition region R of the ultraviolet LED array 3 so as to be opposed thereto. Specifically, the light transmitting member 4 is brought into contact at its rear surface 4b with the front surfaces 10a of the LEDs 10. Further, as shown in FIG. 2, both end portions in the long side direction of the light transmitting member 4 are retained and fixed to the joint portion 29 of the heat sink 5 by end retaining portions 41, and an intermediate portion in the long side direction is retained and fixed to the joint portion 29 by an intermediate retaining portion 51 via the LED unit 20.

Here, as shown in FIG. 4, each of the one end and the other end in the long side direction (left and right direction) of the light transmitting member 4 is located inside by the predetermined value α with respect to each of the one end and the other end of the LED juxtaposition region R of the ultraviolet LED array 3, when viewed from the front. That is, when viewed from the front, the ends in the long side direction of the light transmitting member 4 recede inside by ½ of the predetermined width H of the marginal portion 11 with respect to the ends of the LED juxtaposition region R of the ultraviolet LED array 3, respectively. In other words, the LED juxtaposition region R projects by the predetermined value α (½ of the predetermined width H) with respect to the light transmitting member 4 in the long side direction.

Moreover, as shown in FIG. 3, one end and the other end in the short side direction (up and down direction) of the light transmitting member 4 are also located inside by the predetermined value α with respect to one end and the other end of the LED juxtaposition region R of the ultraviolet LED array 3, respectively, when viewed from the front. That is, when viewed from the front, the ends in the short side direction of the light transmitting member 4 recede inside by ½ of the predetermined width H of the marginal portion 11 with respect to the ends of the LED juxtaposition region R of the ultraviolet LED array 3, respectively. In other words, the LED juxtaposition region R projects by the predetermined value α with respect to the light transmitting member 4 in the short side direction.

Figure 10:
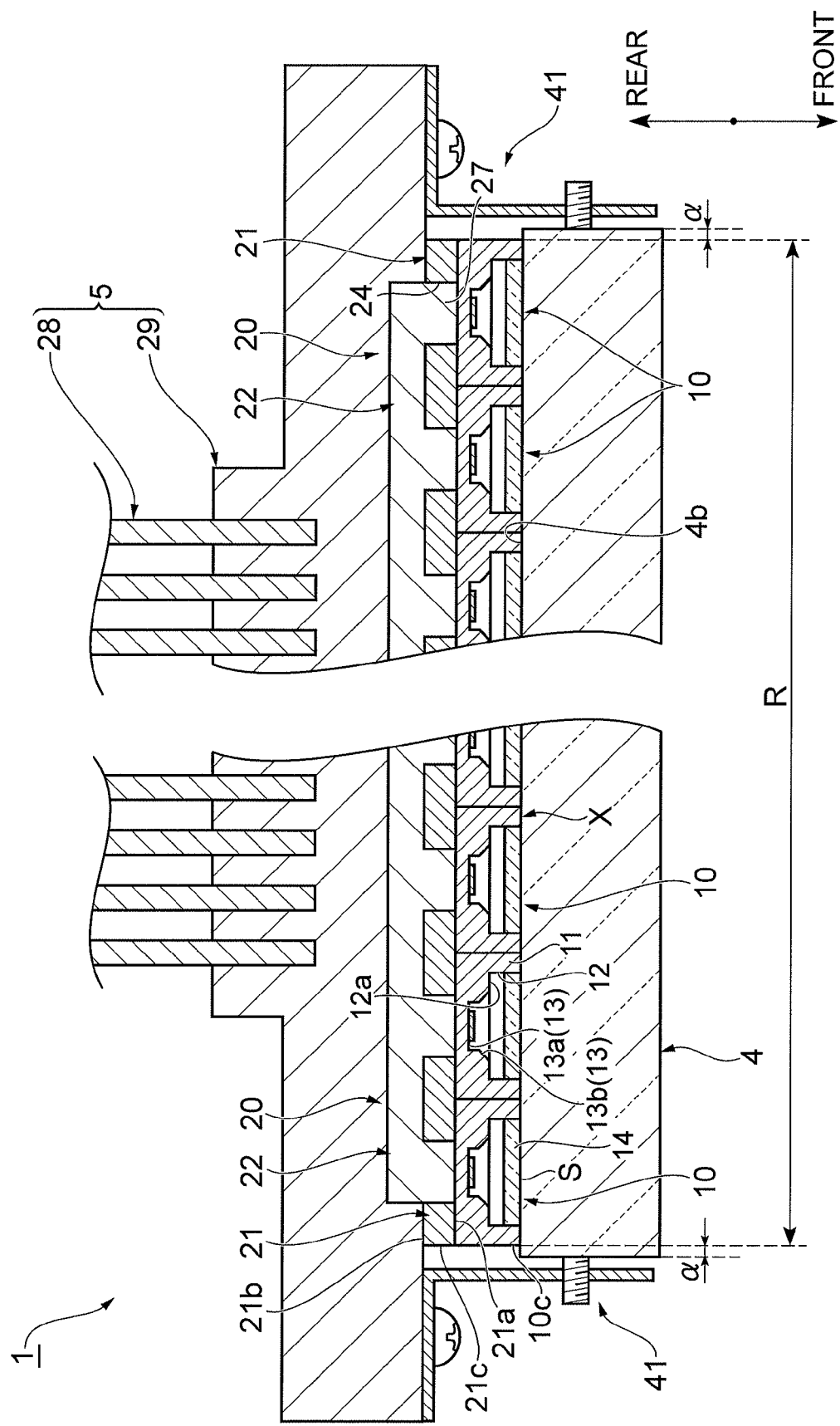
[FIG. 10] A schematic view corresponding to FIG. 4 showing another example of a light transmitting member in the LED light source device of FIG. 1.
Figure 11:
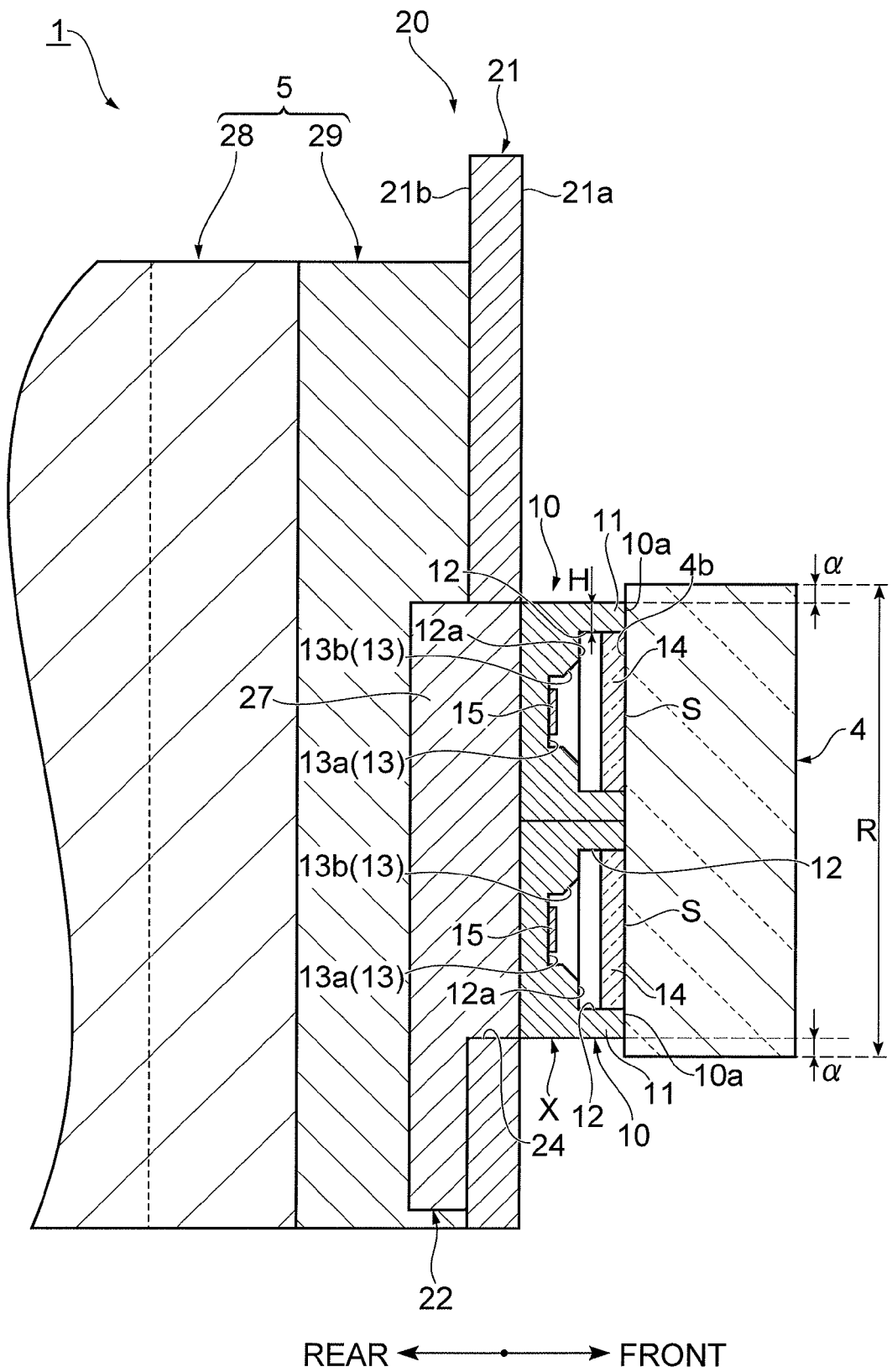
[FIG. 11] A schematic view corresponding to FIG. 3 showing another example of a light transmitting member in the LED light source device of FIG. 1.

Alternatively, in the present embodiment, as shown in FIG. 10, when viewed from the front, the ends in the long side direction of the light transmitting member 4 may be located outside by the predetermined value α (½ of the predetermined width H) with respect to the ends of the LED juxtaposition region R of the ultraviolet LED array 3, respectively, in other words, the LED juxtaposition region R may recede inside by the predetermined value α with respect to the light transmitting member 4 in the long side direction. Moreover, as shown in FIG. 11, when viewed from the front, the ends in the short side direction of the light transmitting member 4 may be located outside by the predetermined value α (½ of the predetermined width H) with respect to the ends of the LED juxtaposition region R of the ultraviolet LED array 3, respectively, in other words, the LED juxtaposition region R may recede inside by the predetermined value α with respect to the light transmitting member 4 in the short side direction.

Specifically, it suffices that the ends of the light transmitting member 4 of the present embodiment, in each of the long side direction and short side direction are located in a range of being inside by the predetermined value α (½ of the predetermined width H) to outside by the predetermined value α with respect to the ends of the LED juxtaposition region R, respectively, when viewed from the front. That is, it suffices to satisfy the condition of the following equation (1) representing a positional relationship when the light transmitting member 4 is disposed in terms of each of the long side direction and short side direction.

$$[\text{End of LED juxtaposition region R} - \text{predetermined value } \alpha] \leq [\text{End of light transmitting member 4}] \leq [\text{End of LED juxtaposition region R} + \text{predetermined value } \alpha] \quad (1)$$

As an equation representing a size of the light transmitting member 4 such as to satisfy the above equation (1) in terms of each of the long side direction and short side direction, the following equation (2) can be mentioned. In connection to this, in the following equation (2), the width of the LED juxtaposition region R can be substituted by (LED width β×number n of LEDs) when the LEDs 10 are arrayed in close contact without a gap.

$$[\text{Width of LED juxtaposition region R} - 2 \times \text{predetermined value } \alpha] \leq [\text{Width of light transmitting member 4}] \leq [\text{Width of LED juxtaposition region R} + 2 \times \text{predetermined value } \alpha] \quad (2)$$

Figure 12:
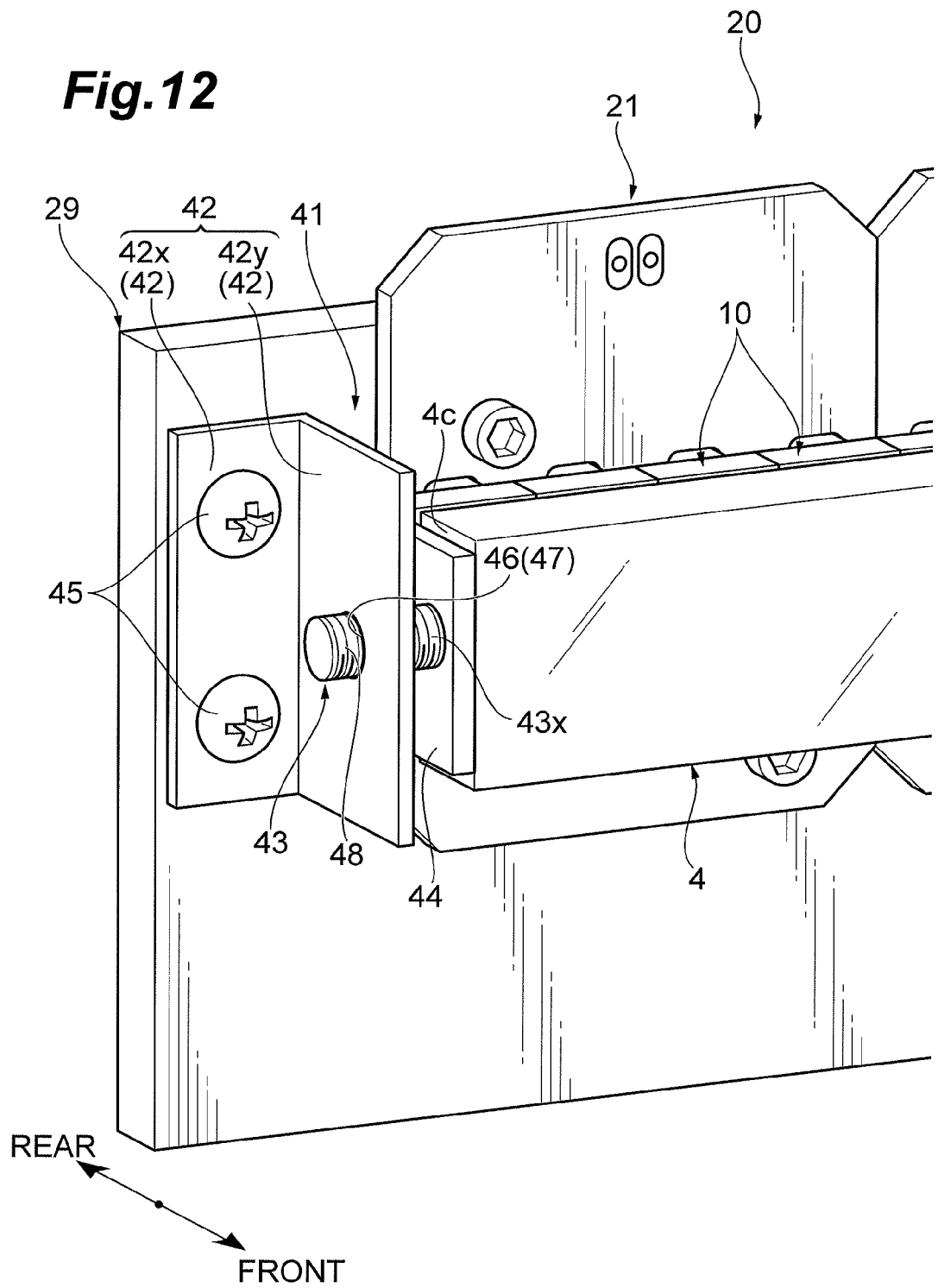
[FIG. 12] A front perspective view showing an end retaining portion of the LED light source device of FIG. 1.

As shown in FIG. 12, both end portions in the long side direction of the light transmitting member 4 are retained and fixed to the joint portion 29 by the end retaining portions 41, respectively, as described above. The end retaining portion 41 includes a stay 42 provided at an end portion of the joint portion 29, a pressing member 43 fixed to the stay 42 so as to be movable in the left and right direction, for pressing a left or right side surface 4c of the light transmitting member 4, and an interposing member 44 interposed between the pressing member 43 and the light transmitting member 4.

The stay 42 shows an L-shape in section created by bending a plate, and includes a base portion 42x that extends in the left and right direction and a projecting portion 42y that continues from the inside in the left and right direction of the base portion 42x and extends so as to project forward. The base portion 42x is fixed to the end portion of the joint portion 29 of the heat sink 5 by a screw 45. In the projecting portion 42y, a through-hole 46 is provided, and at an inner peripheral surface of the through-hole 46, a female screw 47 to be screwed with the pressing member 43 is formed.

The pressing member 43 uses a screw, at an outer peripheral surface of which a male screw 48 is formed. The interposing member 44 is provided as a plate member formed of a material containing a fluororesin. As the material of the interposing member 44, Teflon (registered trademark) is used, for example.

In the end retaining portion 41, by inserting the pressing member 43 through the through-hole 46 to screw the male screw 48 with the female screw 47 and moving by the screwing action the pressing member 43 to the inside in the left and right direction, the side surfaces 4c, 4c (refer to FIG. 2) of the light transmitting member 4 are sandwiched in the left and right direction via the interposing members 44 by means of tip portions 43x of the pressing members 43, respectively. Accordingly, the light transmitting member 4 is mechanically retained and fixed with respect to the joint portion 29 by a pressing force of screwing of the pressing members 43 via the interposing members 44.

Figure 13:
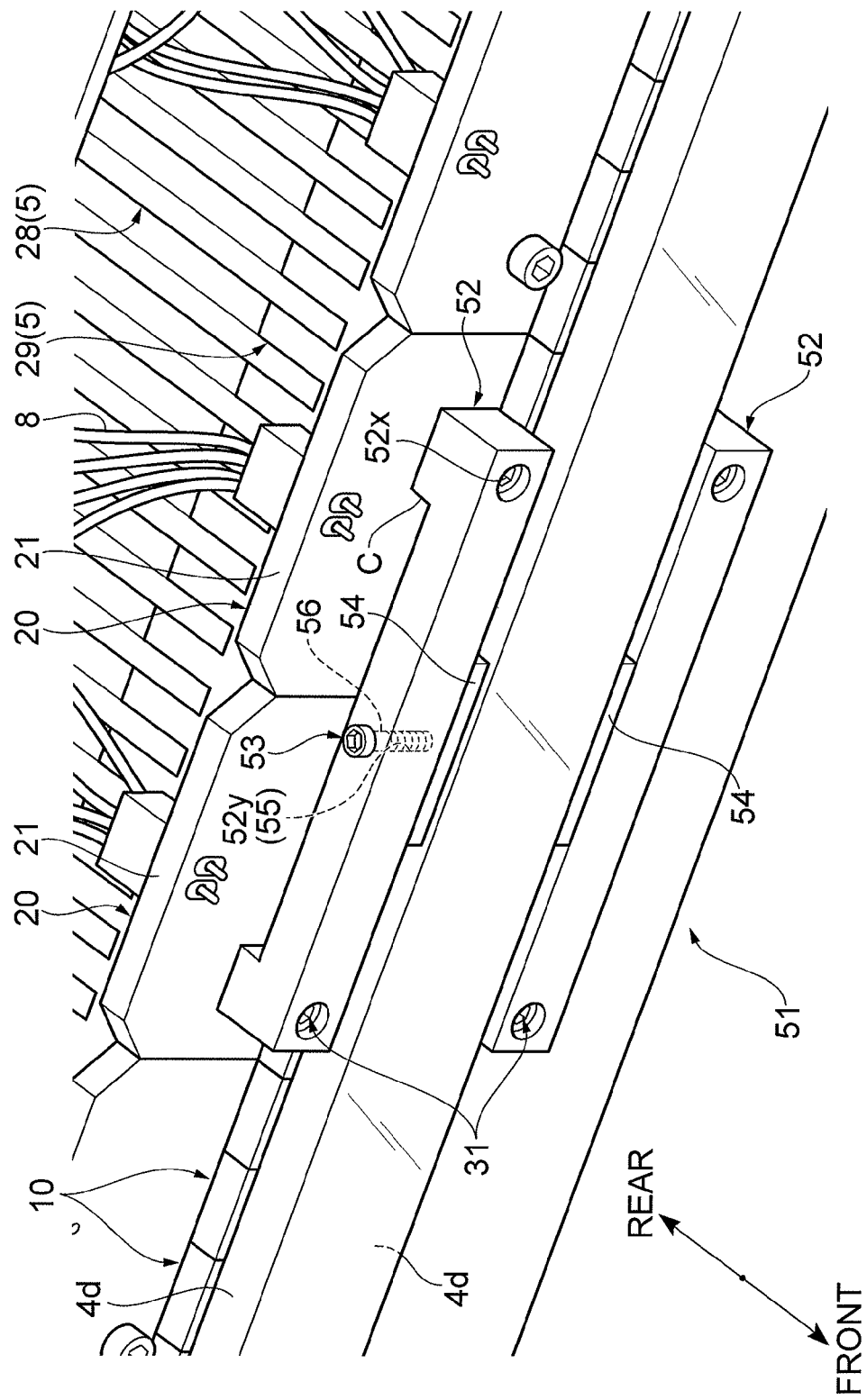
[FIG. 13] A front perspective view showing an intermediate retaining portion of the LED light source device of FIG. 1.

Moreover, as shown in FIG. 13, the intermediate portion in the long side direction of the light transmitting member 4 is retained and fixed to the joint portion 29 via the LED unit 20 by the intermediate retaining portion 51, as described above. The intermediate retaining portion 51 includes main body blocks 52, 52 provided as a pair so as to sandwich the light transmitting member 4 in the up and down direction, pressing members 53 fixed to the main body blocks 52, 52 so as to be movable in the up and down direction, respectively, for pressing an upper or lower side surface 4d of the light transmitting member 4, and interposing members 54 each interposed between the pressing member 53 and the light transmitting member 4.

The main body blocks 52, 52 each show a rectangular parallelepiped outer shape whose long side direction is the left and right direction, and are respectively arranged so as to be opposed via the light transmitting member 4. At both end portions in the left and right direction of the main body block 52, through-holes 52x that communicate with the through-holes 25, 35 of the LED unit 20 are provided. Moreover, in the main body block 52, a through-hole 52y that extends in the up and down direction is provided, and at an inner peripheral surface of the through-hole 52y, a female screw 55 to be screwed with the pressing member 53 is formed.

The pressing member 53 and the interposing member 54 are formed similarly to the pressing member 43 and the interposing member 44, respectively. Specifically, the pressing member 53 uses a screw, at an outer peripheral surface of which a male screw 56 is formed. The interposing member 54 is a plate member formed of a material containing a fluororesin.

In the intermediate retaining portion 51, the main body blocks 52, 52 are disposed so that the through-holes 52x and the through-holes 25, 35 (refer to FIG. 5) of the LED unit 20 communicate with each other, and the screws 31 are inserted through the through-holes 52x, 25, 35 and screwed. Accordingly, the joint portion 29 of the heat sink 5, the substrate 33 of the LED unit 20, and the main body block 52 of the intermediate retaining portion 51 are fixed to each other.

In the fixed state, by inserting the pressing member 53 through the through-hole 52y to screw the male screw 56 with the female screw 55 and moving by the screwing action the pressing member 53 to the inside in the up and down direction, the side surfaces 4d, 4d of the light transmitting member 4 are sandwiched in the up and down direction via the interposing members 54 by means of tip portions of the pressing members 53, respectively. Accordingly, the light transmitting member 4 is further mechanically retained and fixed with respect to the joint portion 29 by a pressing force of screwing of the pressing members 53 via the interposing members 54.

As shown in FIG. 9, a gap C is formed with the substrate 33 at a middle portion in the left and right direction of the main body block 52 of the intermediate retaining portion 51. According to the gap C, interference between the intermediate retaining portion 51 and the power supply wiring portion 26 can be avoided, and it becomes possible to improve the heat dissipation performance of the LED unit 20 and, eventually, the heat dissipation performance of the LEDs 10.

In connection to this, in the LED light source device 1, a fan device (not shown) to send the air inside the case 2 out of the case 2 is disposed, as a cooling structure, behind the heat sink 5. By the fan device, cooling air is led into the case 2 via a cooling vent K1 (refer to FIG. 1) provided in the front cover 2a, a cooling vent K2 provided in a case side surface 2d, and a cooling vent provided in a case lower surface 2e. Then, the cooling air led inside flows rearward along the heat sink 5 to cool the heat sink 5, and is led out of the case 2 from a rear surface 2b (refer to FIG. 1) of the case 2.

At this time, as shown in FIGS. 1 and 2, because the cooling vent K1 is located above the power supply wiring portion 26 of the LED unit 20 in a state where the front cover 2a is mounted, even when foreign matter such as emissions from an irradiation object enters inside through the cooling vent K1, adverse effects to be exerted on the power supply wiring portion 26 as a result of the foreign matter reaching the power supply wiring portion 26 can be suppressed. Further, because air can be led in and led out without being blocked by the LED unit 20, the LEDs 10 can be suitably cooled, and it becomes possible to further improve the operation stability of the LEDs 10.

In the LED light source device 1 configured as in the above, electricity is supplied to the LEDs 10 of each LED unit 20 via the power supply wiring portion 26, and ultraviolet light is emitted forward from the LEDs 10 in the LED juxtaposition region R. The ultraviolet light is led to the light transmitting member 4 to repeat total reflection inside the light transmitting member 4, and is increased in its peak amount of light and uniformized. Then, the ultraviolet light is output forward as an output light through an opening O of the front cover 2a, and an irradiation object is irradiated with the ultraviolet light.

Meanwhile, when performing a process using light energy by an output light being ultraviolet light, it is preferable that the output light is a predetermined amount or more and uniform across the whole area of an emitting region being a region through which ultraviolet light is extracted from the light source (that is, the whole area of a light emitting surface of the light transmitting member 4). However, conventionally, for reasons such that the amount of light of a single LED 10 is lower than that of a single discharge lamp, and there is a difference in the amount of light between a part where the LED 10 is disposed in the emitting region and a part between neighboring LEDs 10, 10, it has been considered difficult to uniformize the amount of light of the emitting region at a predetermined amount or more.

In this regard, because the light transmitting member 4 shows a rectangular parallelepiped outer shape in the present embodiment, reflection and the like when leading ultraviolet light emitted from the LEDs 10 to the light transmitting member 4 can be suppressed as compared to when, for example, a member showing a columnar outer shape (a so-called round rod lens) is used as the light transmitting member 4. That is, ultraviolet light can be reliably led to the light transmitting member 4, and a decrease (loss) in the amount of output light can be suppressed.

Additionally, as described above, the ends of the light transmitting member 4 of the present embodiment are located in a range of being inside by ½ of the predetermined width H of the marginal portion 11 surrounding the emitting surface S to outside by ½ of the predetermined width H with respect to the ends of the LED juxtaposition region R, respectively, when viewed from the front in each of the long side direction and short side direction. Therefore, the amount of light of the emitting region can be made a predetermined amount of light or more and uniformized. This is for the following reasons.

Figure 14:
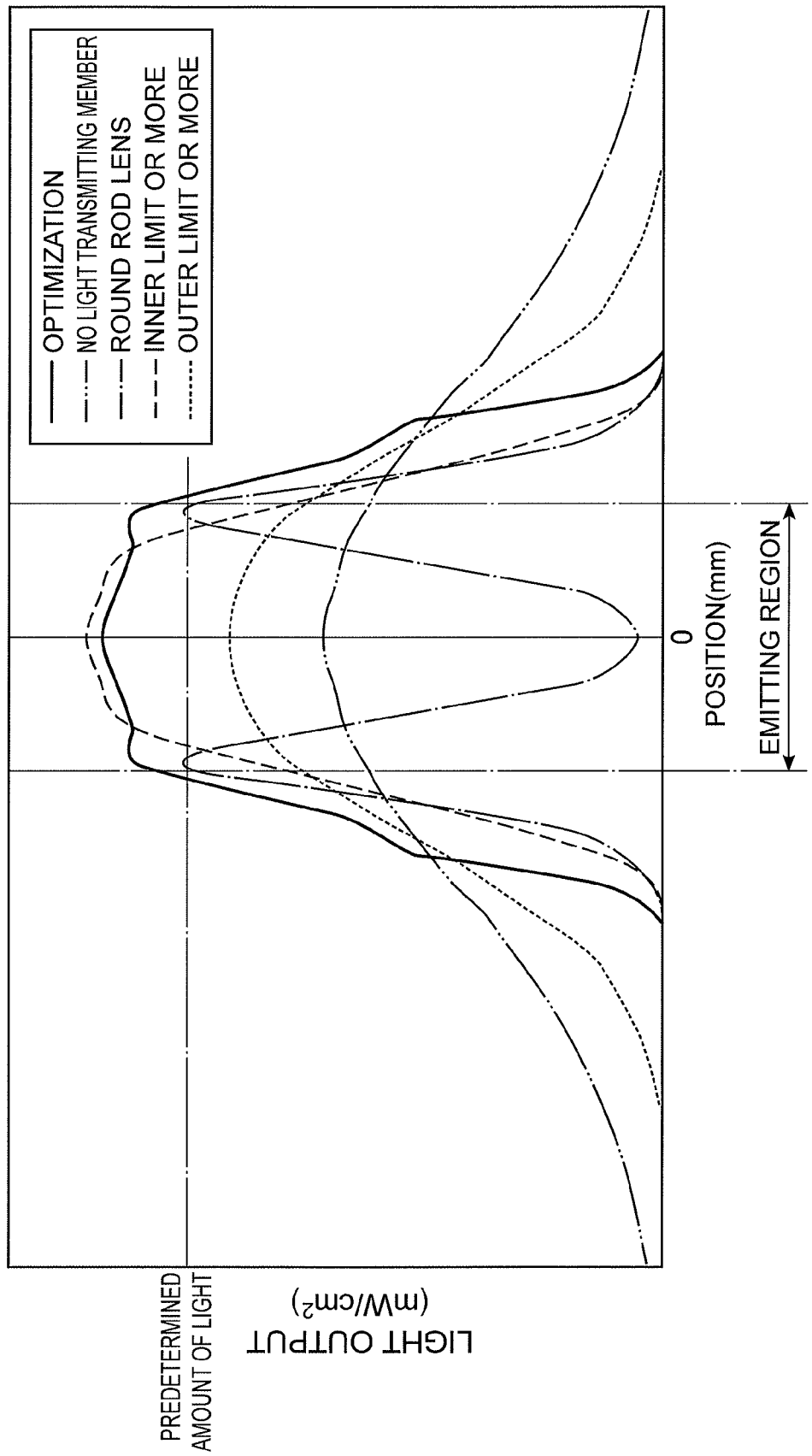
[FIG. 14] A graph showing a relationship between the position and light output (amount) of output light in the LED light source device of FIG. 1.

FIG. 14 is a graph showing a relationship between the position and light output (amount) of output light in the LED light source device of FIG. 1. The position (horizontal axis) in the figure shows positions along the long side direction (or short side direction) passing through the emitting region, and the center of the emitting region is represented by a reference (0 mm).

As shown by the broken line of FIG. 14, when the ends of the light transmitting member 4 are too far apart inside from the ends of the LED juxtaposition region R, respectively ([End of light transmitting member 4]<[End of LED juxtaposition region R]−[Predetermined value α]) in the long side direction, there is provided a distribution of the amount of light gathering toward the center of the emitting region, and the peak amount of light is increased, but the amount of light at end portions of the emitting region is low.

Moreover, as shown by the dotted line of FIG. 14, when the ends of the light transmitting member 4 are too far apart outside from the ends of the LED juxtaposition region R, respectively ([End of light transmitting member 4]>[End of LED juxtaposition region R]+[Predetermined value α]), the distribution of the amount of light shows a so-called fat-tailed state where the amount of light gradually decreases at end portions, and the peak amount of light decreases. Therefore, in these cases, it is difficult to make the amount of light a predetermined amount of light or more and uniformize the amount of light in the whole area of the emitting region.

On the other hand, as in the present embodiment shown by the solid line of FIG. 14, when the ends of the light transmitting member 4 are located in an optimum range ([End of LED juxtaposition region R]—[Predetermined value α]≤[End of light transmitting member 4]≤[End of LED juxtaposition region R]+[Predetermined value α]), the peak amount of light can be sufficiently secured, and a rise and fall in the distribution of the amount of light can be made steep to reduce the area of decrease in the amount of light at end portions of the emitting region. Therefore, it becomes possible to make the amount of light of the emitting region a predetermined amount of light or more and uniformize the amount of light.

In addition, as shown by the alternate long and short dashed line of FIG. 14, it can be understood that, when a round rod lens was used as the light transmitting member 4, not only is the peak amount of light low but the use efficiency of ultraviolet light emitted from the LEDs 10 (integral amount of output light) has also decreased. That is, it can be understood that, in this case, ultraviolet light that had needed to enter the light transmitting member 4 was intercepted, and the amount of extraction of ultraviolet light from the light transmitting member 4 was also reduced, and thus the amount of output light has decreased. Moreover, as shown by the alternate long and two short dashed line of FIG. 14, it can be understood that, when the light transmitting member 4 was not provided, the peak amount of light has considerably decreased, and a remarkable fat-tailed state was brought about. In connection to this, when a reflector is used in place of the light transmitting member 4, loss occurs in reflection of ultraviolet light, and thus loss in the amount of light is increased also in this case.

Moreover, in the present embodiment, as described above, the rear surface 4b of the light transmitting member 4 is in contact with the front surfaces 10a of the LEDs 10, ultraviolet light emitted from the LEDs 10 can be reliably led to the light transmitting member 4, and it becomes possible to suppress a decrease in the amount of light. As a result, in the LED light source device 1, a large amount of output light can be obtained in the emitting region. Moreover, the ultraviolet LED array 3 and the light transmitting member 4 come into surface contact, so that a change in the emitting condition of output light as a result of a change in the positional relationship between the ultraviolet LED array 3 and the light transmitting member 4 due to an external factor such as vibration can be suppressed.

Moreover, in the present embodiment, as described above, the LEDs 10 are unitized as the LED unit 20. Therefore, handling of the LEDs 10 in replacement and in manufacturing can be facilitated. Furthermore, the plurality of LED units 20 are, with the LEDs 10 juxtaposed so as to be adjacent to each other on the side of the front surface 33a of the substrate 33, juxtaposed so that the LEDs 10 are adjacent between the neighboring LED units 20. Therefore, the LEDs 10 can be easily provided in a dense arrangement, and it becomes possible to obtain a large amount of light uniformly in the emitting region.

Moreover, in the present embodiment, as described above, the LEDs 10 are disposed on the substrate 21 so that, in the LED unit 20, the side surfaces 10c of the LEDs 10 and the side surface 21 c of the substrate 21 form the same plane (that is, so that the peripheries of the LEDs 10 and the periphery of the substrate 33 become coincident). Therefore, by juxtaposing the LED units 20 adjacently (making the LED units 20 neighbor without a gap) according to the emitting region, the LEDs 10 between the LED units 20 can also be provided in a dense arrangement, and eventually, the LEDs 10 can be provided in a dense arrangement for the light source as a whole. As a result, it becomes possible to obtain a larger amount of light uniformly in the emitting region. The same plane in the above implies not only "completely the same" planes but also "substantially the same" planes, in which variations due to, for example, dimensional tolerances and errors in manufacturing are included.

Moreover, in the present embodiment, as described above, the heat dissipating surfaces 17 of the LEDs 10 are connected to the thermally conductive plate 22 via the through-holes 24 formed in the substrate 33, and the heat sink 5 is connected to the thermally conductive plate 22. Therefore, the heat dissipation performance of the LEDs 10 can be improved, and it becomes possible to improve the operation stability of the LEDs 10 and prevent output degradation and shortened lifetime of the LEDs 10. Particularly, the thermally conductive plate 22 is not provided for each LED 10, but a plurality of LEDs 10 are collectively connected to the thermally conductive plate 22, and thus a heat dissipation plate of a larger heat capacity can be used. As a result, in the LED light source device 1, a large amount of output light can be stably obtained.

Moreover, in the present embodiment, as described above, the side surfaces 4c, 4c of the light transmitting member 4 are sandwiched by a pressing force of screwing of the pressing members 43 via the interposing members 44, and the side surfaces 4d, 4d of the light transmitting member 4 are sandwiched by a pressing force of screwing of the pressing members 53 via the interposing members 54, and accordingly, the light transmitting member 4 is fixed. By thus fixing the light transmitting member 4 by mechanical retention, for example, a situation where an adhesive deteriorates under the influence of ultraviolet light when the light transmitting member 4 is fixed by only adhering fixation, resulting in an insufficient fixing ability can be prevented, and it becomes possible to stably fix the light transmitting member 4 over a long period of time.

Moreover, as in the above, the interposing members 44, 54 are formed of a material containing a fluororesin that hardly deteriorates because of having high resistance against ultraviolet light and high temperature. Therefore, the ultraviolet resistance property and heat resistance property can be improved with regard to fixation of the light transmitting member. Additionally, because the fluororesin-containing material is softer than quartz, direct exertion of a concentrated stress due to screwing of the pressing members 43, 53 on the light transmitting member 4 that is a fragile quartz member can be suppressed.

Moreover, screws are used as the pressing members 43, 53 (the pressing members 43, 53 have screw mechanisms), and the light transmitting member 4 is fixed by a pressing force of screwing, and thus fine adjustment of the pressing force, fine adjustment of the fixing position, and the like can be easily performed.

Moreover, in the present embodiment, the joint portion 29, the substrate 33, and the main body block 52 are fixed to each other by inserting the screws 31 through the through-holes 52x of the main body blocks 52, 52 and the through-holes 25, 35 of the LED unit 20 and screwing. Therefore, it becomes possible to use a fixing structure of the intermediate retaining portion 51 also as a fixing structure of the LED unit 20.

In connection to this, when lamps are used as a light source as in a conventional light source device, the light source has a short lifetime, and it has been difficult to irradiate a heat-sensitive irradiation object, but by using LEDs 10 as in the present embodiment, it becomes possible to prolong the lifetime, and it becomes possible to irradiate also a heat-sensitive irradiation object. Moreover, the light transmitting member 4 functions also as, for example, a window member for preventing contamination of the LEDs 10 due to foreign matter from an irradiation object.

In the above, a preferred embodiment of the present invention has been described, but the present invention is not limited to the above-described embodiment. For example, in the above-described embodiment, the light transmitting member 4 is fixed only by mechanical retention with respect to the ultraviolet LED array 3, but in addition to this, for example, as shown in the following, the light transmitting member 4 may be fixed by adhesion with respect to the ultraviolet LED array 3.

Figure 15:
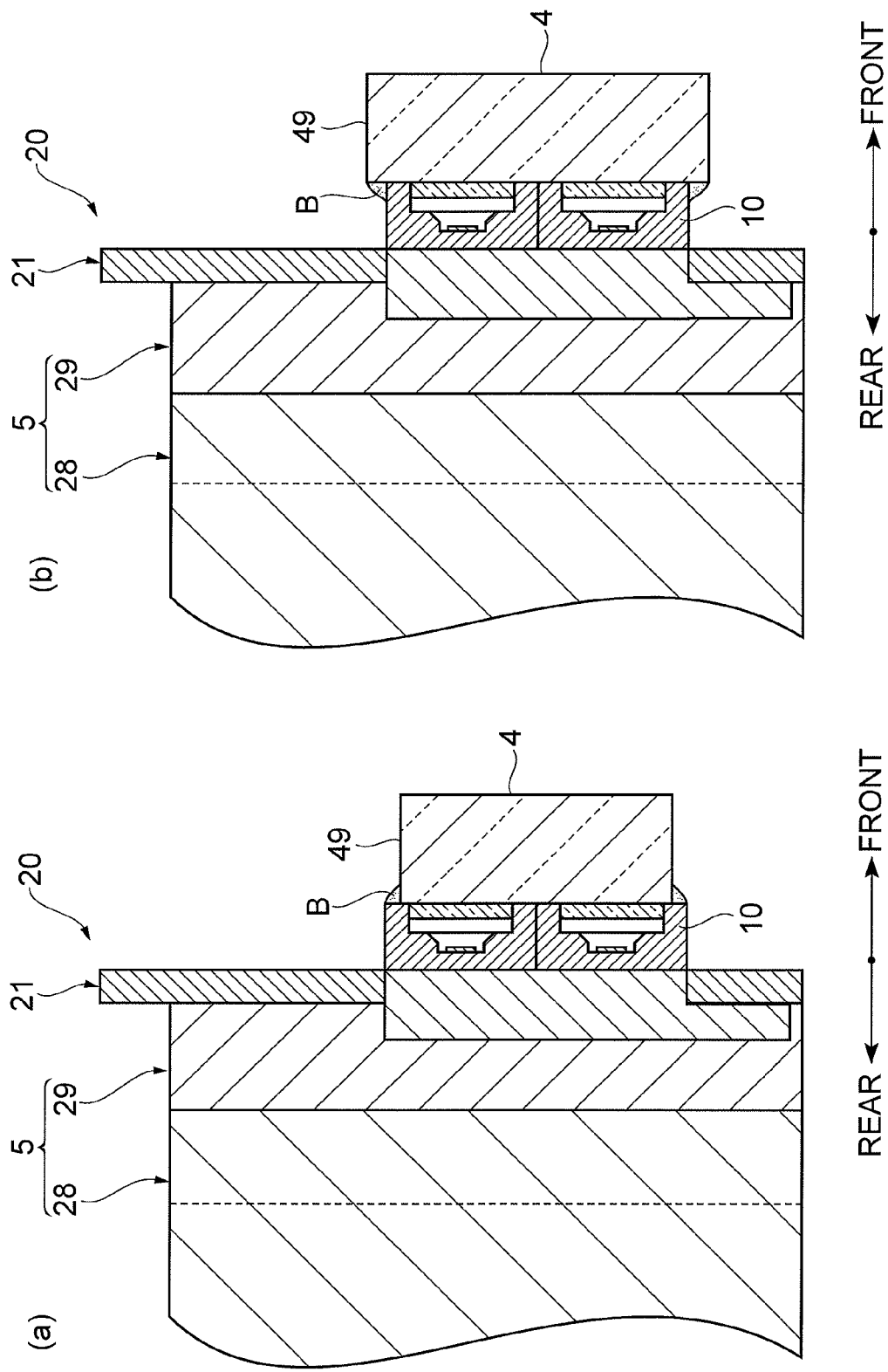
[FIG. 15] Sectional views corresponding to FIG. 3 showing examples where a light transmitting member is fixed by adhesion with respect to an ultraviolet LED array.

FIG. 15(a) is a sectional view corresponding to FIG. 3 showing an example when the light transmitting member 4 is fixed by adhesion with respect to the ultraviolet LED array 3, and FIG. 15(b) is a sectional view corresponding to FIG. 3 showing another example when the light transmitting member 4 is fixed by adhesion with respect to the ultraviolet LED array 3. As shown in FIG. 15(a), when the ends of the light transmitting member 4 are located inside with respect to the ends of the LED juxtaposition region R, respectively, an adhesive B may be provided in a fillet shape between the front surface 10a of the LED 10 and a side surface 49 of the light transmitting member 4 to fix the light transmitting member 4 by adhesion. Moreover, as shown in FIG. 15(b), when the ends of the light transmitting member 4 are located inside with respect to the ends of the LED juxtaposition region R, respectively, an adhesive B may be provided in a fillet shape between a side surface 19 of the LED 10 and the rear surface 4b of the light transmitting member 4 to fix the light transmitting member 4 by adhesion.

Thus, by fixing the light transmitting member 4 by adhesion with respect to the ultraviolet LED array 3, the light transmitting member 4 can be fixed stably and at a low cost. Moreover, in the case of adhesion fixation by providing an adhesive B between the side surface 19 of the LED 10 and the rear surface 4b of the light transmitting member 4, because the adhesive B is disposed on the rear side further than the front surface 10a including the emitting surface S of the LED 10, exertion of adverse effects of ultraviolet light on the adhesive B can be suppressed.

Moreover, in the above-described embodiment, the LEDs 10 are disposed on the substrate 21 so that the side surfaces 10c of the LEDs 10 are located on the same plane as the side surface 21c of the substrate 21, but the LEDs 10 may be disposed on the substrate 21 so that the side surfaces 10c of the LEDs 10 project to the outside further than the side surface 21 c of the substrate 21 (so that the LEDs 10 protrude from the substrate 21), and the same advantageous effects are obtained.

Moreover, the light transmitting member 4 of the above-described embodiment is sandwiched and fixed in the long side direction by a pressing force of screwing of the pressing member 43, and is sandwiched and fixed in the short side direction by a pressing force of screwing of the pressing member 53, but the light transmitting member 4 may be sandwiched in either the long side direction or short side direction. At this time, it is preferable to sandwich the light transmitting member 4 in the long side direction because the effect to be exerted on the fixing ability of the light transmitting member 4 is great as compared with when sandwiching the light transmitting member 4 in the short side direction. The mechanical retention may be used together with adhesion fixation of the light transmitting member 4 as in the above, and in some cases, only adhesion fixation may be performed to make mechanical retention unnecessary.

Moreover, in the above-described embodiment, the light transmitting member 4 and the LED 10 are in contact with each other, but a predetermined gap may be formed therebetween. Moreover, in the above-described embodiment, the marginal portion 11 has a rectangular frame shape, but the marginal portion is not limited hereto, and formed according to the shape of the front surface 10a of the LED 10, and may be formed as a region that is not flush with the emitting surface S in the front surface 10a. For example, there may be a step-like shape such that the glass plate 14 to serve as the emitting surface S is placed on the marginal portion 11.

Moreover, in the above-described embodiment, a plurality of

LEDs 10 are juxtaposed in a matrix to form an LED juxtaposition region R, but LEDs 10 may be juxtaposed in a line shape to form an LED juxtaposition region R. Moreover, in the LED 10, the predetermined width H of the marginal portion 11 in the short side direction and the predetermined width H of the marginal portion 11 in the long side direction are provided as the same size, but these widths may be different. In this case, the predetermined value α corresponds to the predetermined width H in each of the short side direction and long side direction.

The LEDs 10 are disposed so as to closely contact each other in the drawings, but may be disposed with so small a gap therebetween as not to cause variation in the amount of light. In this case, manufacturing of the LED unit 20 and, eventually, the LED light source device 1 can be facilitated.

Moreover, fixation of the light transmitting member 4 is not limited to that of the above-described embodiment, and for example, the light transmitting member 4 may be fixed in the LED light source device 1 in the following manner.

Figure 16:
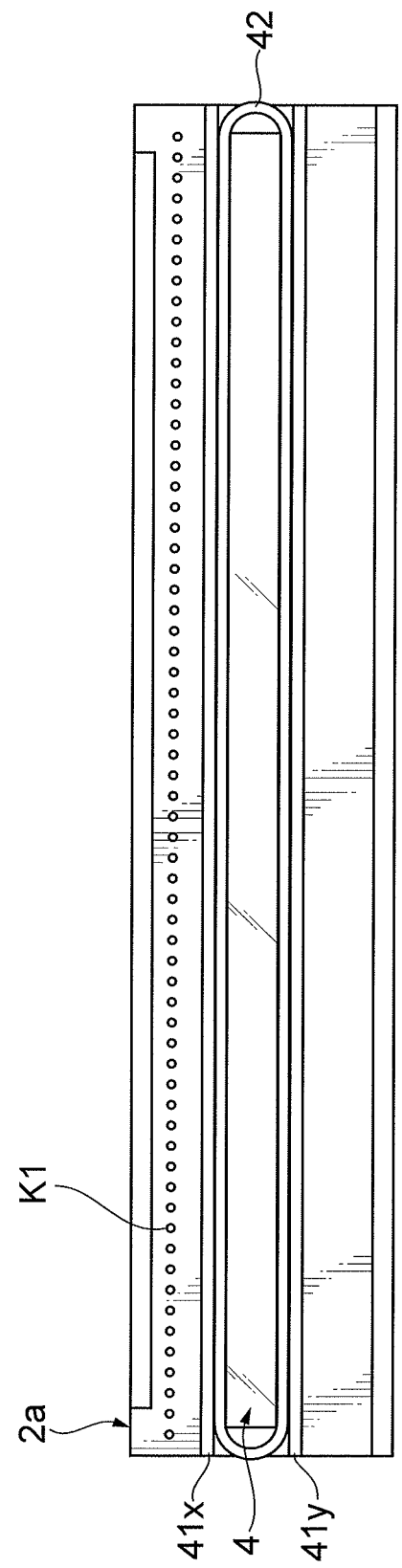
[FIG. 16] A rear view showing a light transmitting member.
Figure 17:
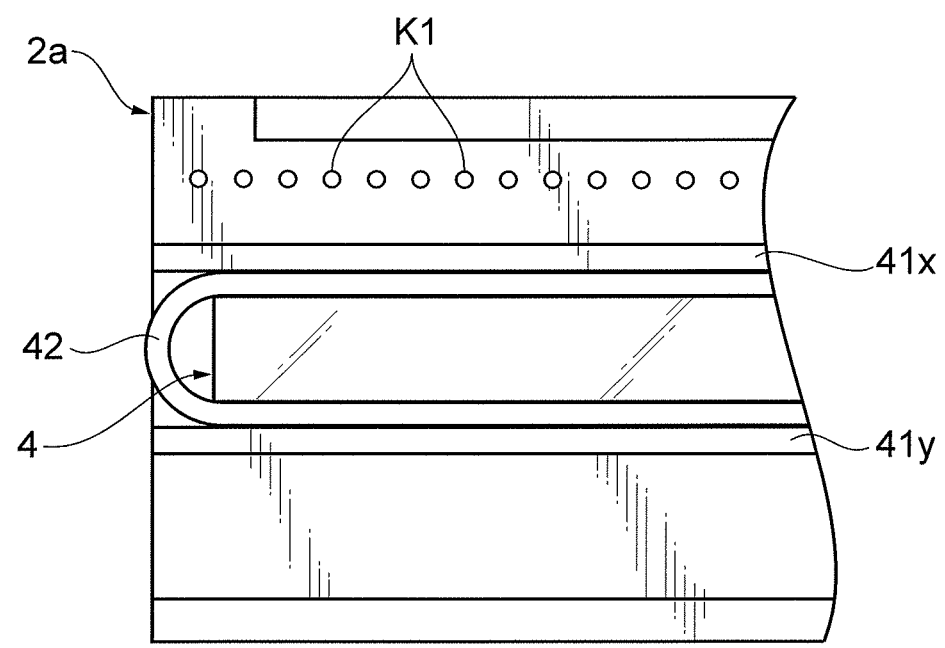
[FIG. 17] A view showing a part of FIG. 16 in an enlarged manner.
Figure 18:
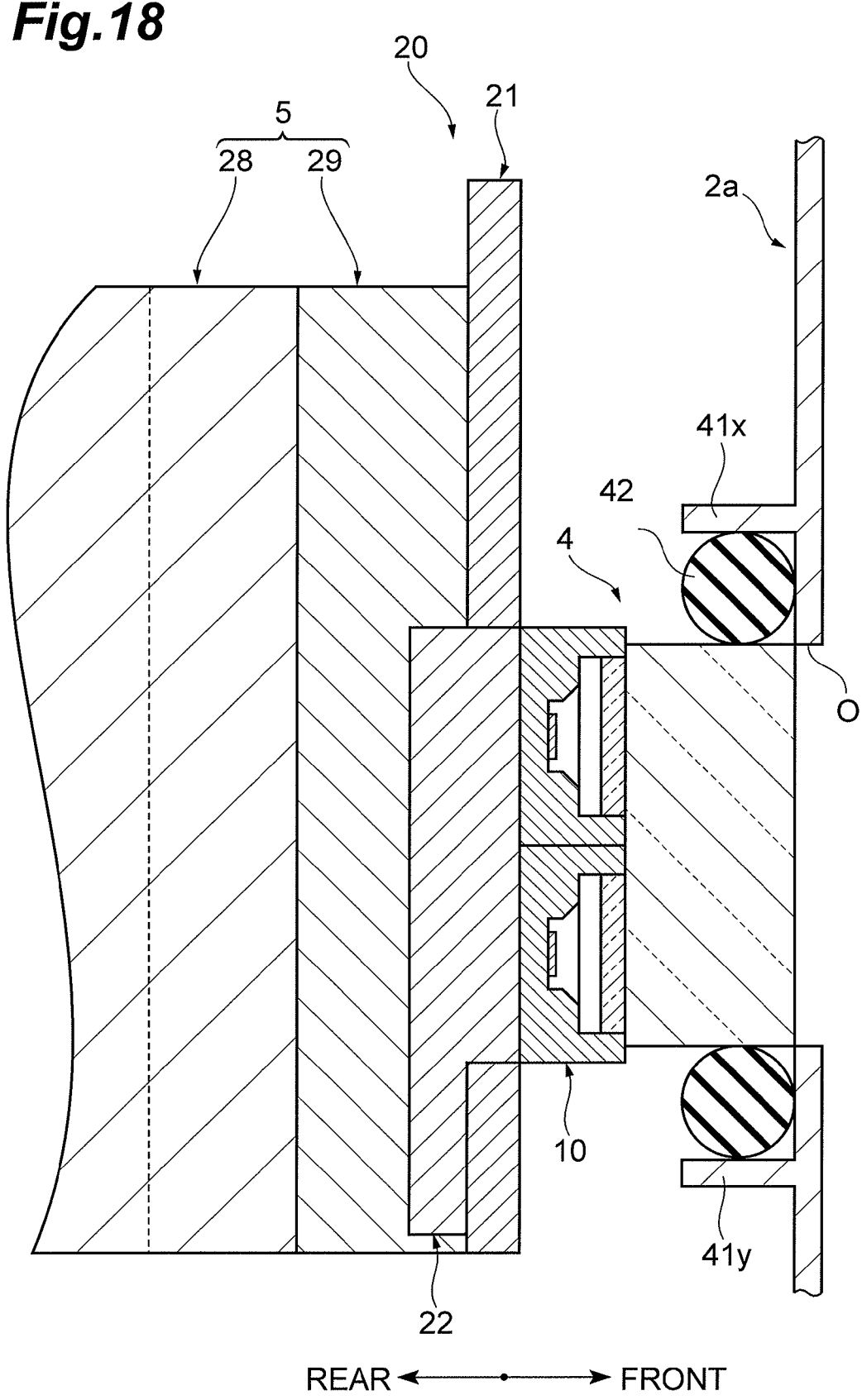
[FIG. 18] A schematic view corresponding to FIG. 3 showing a light transmitting member.

FIG. 16 is a rear view showing a light transmitting member, FIG. 17 is a view showing a part of FIG. 16 in an enlarged manner, and FIG. 18 is a schematic view corresponding to FIG. 3 showing a light transmitting member. As shown in FIGS. 16 to 18, the light transmitting member 4 is attached to an inner surface side of the front cover 2a of the case 2 via an O-ring (resin member) 42.

At an upper side and a lower side of an opening O in the inner surface of the front cover 2a, flanges 41x, 41y as wall portions extending in the left and right direction are provided, respectively. In the front cover 2a, the width (length in the up and down direction) of the opening O is made substantially equal to the width (length in the up and down direction) of the light transmitting member 4. The O-ring 42 is formed of a resin.

For the light transmitting member 4 here, specifically, the O-ring 42 is provided so as to wind around its side surfaces 4c, 4d, and the light transmitting member 4 is in this state fitted between the flanges 41x, 41y of the front cover 2a so as to be sandwiched between the flanges 41x, 41y. That is, the light transmitting member 4 is fixed to the front cover 2a as a result of its upper and lower surfaces being sandwiched via the O-ring 42 by the flanges 41x, 41y. Therefore, as shown in FIG. 18, the light transmitting member 4 is brought into contact with the LEDs 10 so as to be opposed to the front side of the LEDs 10 as well as fixed to the front cover 2a while being positioned with respect to the LEDs 10 and the opening O. As a result, the LEDs 10 face the outside through the opening O via the light transmitting member 4.

According to the modification described in the above, because the light transmitting member 4 is attached to the inner surface side of the front cover 2a by fixation via the O-ring 42, positioning of the light transmitting member 4 can be easily performed for fixing the light transmitting member 4, and it becomes possible to fix the light transmitting member 4 simply and accurately in the LED light source device 1. Moreover, because the light transmitting member 4 can be detached from the side of the LEDs 10 only by removing the front cover 2a, maintenance such as cleaning of the light transmitting member 4 is facilitated. Moreover, it becomes no longer necessary to unfix the light transmitting member 4 also in replacement of the LEDs 10.

Moreover, in the above-described modification, as described above, no wall portions such as flanges are provided at sides in the left and right direction of the opening O, and the O-ring 42 is not pressed in the left and right direction. Accordingly, a force produced when the light transmitting member 4 provided with the O-ring 42 is attached to the front cover 2a can be released in the left and right direction (that is, so-called relief portions can be formed in the left and right direction of the front cover 2a), so that such attachment can be facilitated, and the possibility of damage to the light transmitting member 4 during attachment can be reduced. Moreover, the relief portions also allow releasing thermal stress in thermal expansion.

Moreover, in the above-described modification, as described above, the upper and lower side surfaces 4d, 4d of the light transmitting member 4 showing a shape that is long in the left and right direction are sandwiched for fixation, and thus the area to be involved in fixation can be increased as compared with when the left and right side surfaces 4c, 4c of the light transmitting member 4 are sandwiched for fixation, so that the light transmitting member 4 can be reliably fixed. Moreover, because the area to be involved in fixation can thus be increased, stress to act on the light transmitting member 4 when fixing the light transmitting member 4 can be reduced, and it becomes possible to reduce the possibility of damage to the light transmitting member 4.

Moreover, in the above-described modification, as described above, the light transmitting member 4 is fixed via the O-ring 42, and thus in the case of thermal expansion of the light transmitting member 4, the O-ring 42 can be made to act as a buffer, and it becomes possible to further reduce the possibility of damage to the light transmitting member 4.

Moreover, the thickness (length in the front and rear direction) of the O-ring 42 in the above-described modification is thinner than the thickness of the light transmitting member 4. Accordingly, for example, a reduction in the amount of light as a result of the O-ring 42 entering into the emitting region of the LEDs 10 and a reduction in adhesion between the LEDs 10 and the light transmitting member 4 due to the O-ring 42 can be suppressed.

In addition, the light transmitting member 4 may be fixed by interposing a plate-shaped resin member between the light transmitting member 4 and the flanges 41x, 41y in place of the O-ring 42. In connection to this, when the light transmitting member 4 is fixed by means of the O-ring 42 as in the above-described modification, the light transmitting member 4 can be easily fixed to the front cover 2a because of excellent handling ability of the O-ring 42.

Industrial Applicability

According to the present invention, it becomes possible to make the amount of light of the emitting region a predetermined amount of light or more and uniformize the amount of light.

REFERENCE SIGNS LIST

1—LED light source device, 2—case, 2a—front cover, 3—ultraviolet LED array, 4—light transmitting member, 4c, 4d—side surface of light transmitting member, 5—heat sink, 10—LED, 10a—front surface of LED, 10c—side surface of LED, 11—marginal portion, 20—LED unit, 21—substrate, 21a—front surface of substrate, 21b—rear surface of substrate, 21c—side surface of substrate, 22—thermally conductive plate (metal plate), 24—through-hole, 42—O-ring (resin member), 43, 53—Pressuring member, 44, 54—interposing member, H—predetermined width, R—LED juxtaposition region, S—emitting surface

The invention claimed is:
1. An LED light source device comprising:
an ultraviolet LED array including an LED juxtaposition region in which LEDs that emit ultraviolet light toward a front are juxtaposed; and
a light transmitting member provided on a front side of the LED juxtaposition region of the ultraviolet LED array so as to be opposed thereto, showing a rectangular parallelepiped outer shape, and formed of a material containing quartz, wherein
at a front surface of the LEDs, an emitting surface surrounded by a marginal portion of a predetermined width and for emitting the ultraviolet light is provided, and
when viewed from the front, an end of the light transmitting member is located between inside by ½ of the predetermined width and outside by ½ of the predetermined width with respect to an end of the LED juxtaposition region of the ultraviolet LED array, wherein:
the LED array comprises a plurality of LED units arranged adjacently within the juxtaposition region and wherein each LED unit comprises a single substrate on which a plurality of LEDs are adjacently arranged,
the plurality of LED units are adjacently arranged along a long side direction of a light emitting surface of the light transmitting member,
the light transmitting member is arranged so as to extend across the plurality of LED units,
the substrate of each LED unit comprises an end portion extending beyond the light transmitting member in a short side direction thereof, and a power supply wiring portion with respect to the LED is arranged thereon, each LED unit comprises a metal plate provided on a rear surface side of the substrate, and the metal plate is thermally connected with the LEDs via a through-hole formed in the substrate, and a heat sink is thermally connected with the metal plate, each LED unit comprises a power supply wiring portion provided on the substrate at a position distal to the heat sink in the short side direction, the ultraviolet LED array, the light transmitting member, and the heat sink are housed in a case, the heat sink has a fin structure, the end portion of the substrate on which the power supply wiring portion is provided in the LED unit projects out to a position distal to the heat sink so as to reach an inner surface of the case, the wiring connected to the power supply wiring portion extends into a space between the fin structure of the heat sink and the inner surface of the case, the end portion of the substrate on which the power supply wiring portion is provided divides a space on the fin structure side and a space on the light transmitting member side in the case, and the light transmitting member is included in an LED disposition area when viewed from the front.

2. The LED light source device according to claim 1, wherein the light transmitting member is in contact with a front surface of the LEDs.

3. The LED light source device according to claim 1, wherein the LEDs show a rectangular parallelepiped outer shape, and are disposed on the substrate so that a side surface thereof is located on the same plane as a side surface of the substrate or disposed on the substrate so that a side surface thereof projects to the outside further than a side surface of the substrate.

4. The LED light source device according to claim 1, wherein the light transmitting member is fixed by a pair of opposing side surfaces thereof being sandwiched by pressing members via interposing members.

5. The LED light source device according to claim 4, wherein the interposing member is formed of a material containing a fluororesin.

6. The LED light source device according to claim 4, wherein the pressing member has a screw mechanism.

7. The LED light source device according to claim 1, comprising a case for housing the ultraviolet LED array and the light transmitting member, wherein in a front cover of the case, a pair of wall portions extending in a long side direction of the light transmitting member are formed, and the light transmitting member is fixed to the front cover by being sandwiched by the pair of wall portions via a resin member.

8. The LED light source device according to claim 7, wherein the resin member is an O-ring provided so as to wind around side surfaces of the light transmitting member.

9. The LED light source device according to claim 1, wherein the light transmitting member is fixed by adhesion with respect to the ultraviolet LED array.

10. The LED light source device according to claim 1, wherein the light transmitting member has a long side direction along an LED juxtaposition region and a short side direction along an LED juxtaposition region, and satisfies the dispositional conditions such that, when viewed from the front, an end of the light transmitting member is located between inside by ½ of the predetermined width and outside by ½ of the predetermined width with respect to an end of the LED juxtaposition region in both the long side direction and the short side direction.

11. The LED light source device according to claim 1, wherein the light transmitting member has a short side direction along the LED juxtaposition region, with a length of said short side direction being thicker than a thickness of the light transmitting member.

12. The LED light source device according to claim 1, wherein the outer surface of the light transmitting member has been subjected to mirror polishing.

13. An LED light source device comprising:

an ultraviolet LED array including an LED juxtaposition region in which LEDs that emit ultraviolet light toward a front are juxtaposed; and a first light transmitting member provided on a front side of the LED juxtaposition region of the ultraviolet LED array so as to be opposed thereto, wherein the first light transmitting member is a unitary member extending along the long side direction of the LED juxtaposition region, and wherein each LED is provided with:

a housing having a recess portion comprising a reflecting surface, a semiconductor crystal positioned at a bottom surface of the recess portion, and a second light transmitting member which is positioned so as to block the recess portion and which comprises an emitting surface that emits an ultraviolet light;

the first light transmitting member being positioned so as to contact with the housing of the LEDs or the second light transmitting member, and when viewed from the front, to cover every second light transmitting member, wherein the LED juxtaposition region is a region surrounded by an outer margin of a group of housings of juxtaposed LEDs, and the first light transmitting member is included in an LED disposition area when viewed from the front, and wherein the LED array comprises a plurality of LED units arranged adjacently within the juxtaposition region and wherein each LED unit comprises a single substrate on which a plurality of LEDs are adjacently arranged, the plurality of LED units are adjacently arranged along a long side direction of a light emitting surface of the light transmitting member, the light transmitting member is arranged so as to extend across the plurality of LED units, the substrate of each LED unit comprises an end portion extending beyond the light transmitting member in a short side direction thereof, and a power supply wiring portion with respect to the LED is arranged thereon, each LED unit comprises a metal plate provided on a rear surface side of the substrate, and the metal plate is thermally connected with the LEDs via a through-hole formed in the substrate, and a heat sink is thermally connected with the metal plate, each LED unit comprises a power supply wiring portion provided on the substrate at a position distal to the heat sink in the short side direction, the ultraviolet LED array, the light transmitting member, and the heat sink are housed in a case, the heat sink has a fin structure, the end portion of the substrate on which the power supply wiring portion is provided in the LED unit projects out to a position distal to the heat sink so as to reach an inner surface of the case, the wiring connected to the power supply wiring portion extends into a space between the fin structure of the heat sink and the inner surface of the case, and the end portion of the substrate on which the power supply wiring portion is provided divides a space on the fin structure side and a space on the light transmitting member side in the case.

14. The LED light source device according to claim 13, wherein a rear face of the first light transmitting member is planar and the emitting surface of the second light transmitting member is planar, the rear surface and the emitting surface being disposed substantially in parallel with each other.

15. The LED light source device according to claim 13, wherein the ultraviolet LED array comprises the LEDs being juxtaposed two-dimensionally.

\* \* \* \* \*